United States Patent [19]

de Pommery et al.

[11] 4,450,535
[45] May 22, 1984

[54] SYSTEM AND METHOD FOR AUTHORIZING ACCESS TO AN ARTICLE DISTRIBUTION OR SERVICE ACQUISITION MACHINE

[75] Inventors: Bertrand de Pommery, St. Nom la Breteche; Michel Ugon, Maurepas, both of France

[73] Assignee: Compagnie Internationale pour l'Informatique CII-Honeywell Bull (Societe Anonyme), Paris, France

[21] Appl. No.: 302,621

[22] Filed: Sep. 15, 1981

[30] Foreign Application Priority Data

Sep. 16, 1980 [FR] France ............... 80 19951

[51] Int. Cl.³ .................................................. G06F 15/20
[52] U.S. Cl. .................................... 364/900; 364/405
[58] Field of Search ............ 364/200 MS, 900 MS, 364/405, 408; 235/379, 380, 381, 382, 487, 441

[56] References Cited

U.S. PATENT DOCUMENTS

| | | | |
|---|---|---|---|
| 3,631,403 | 12/1971 | Asbo et al. | 364/200 |
| 3,946,220 | 3/1976 | Brobeck et al. | 364/405 |
| 4,001,550 | 1/1977 | Schatz | 235/379 |
| 4,004,133 | 1/1977 | Hannan et al. | 235/441 |
| 4,070,564 | 1/1978 | Tucker | 364/405 |
| 4,092,524 | 5/1978 | Moreno | 235/419 |
| 4,095,739 | 6/1978 | Fox et al. | 235/382 |
| 4,105,156 | 11/1978 | Dethloff | 235/441 |
| 4,134,537 | 1/1979 | Glaser et al. | 235/379 |
| 4,166,945 | 9/1979 | Inoyama et al. | 235/379 |
| 4,211,919 | 7/1980 | Ugon | 235/487 |
| 4,220,991 | 9/1980 | Hamano et al. | 364/405 |
| 4,234,932 | 11/1980 | Gorgens | 364/900 |
| 4,310,885 | 1/1982 | Azcua et al. | 364/405 |

OTHER PUBLICATIONS

*M6800 Microprocessor Applications Manual*, Motorola Inc., pp. 3-26 and 3-27, 1975.

*Primary Examiner*—Jerry Smith
*Assistant Examiner*—Mark P. Watson
*Attorney, Agent, or Firm*—Kerkam, Stowell, Kondracki & Clarke

[57] ABSTRACT

A system and method for distribution of articles or services, especially adapted to be secure against use by unauthorized personel, receives first and second data carriers. Each data carrier includes a processor, data storage, and interfacing circuits. A random number generator feeds a random number to each of the data carriers which use a program to generate a resultant based on the random number, a secret code and an identification number. The secret code and identification number are stored in the data storage of each data carrier. The resultants are compared to determine if they are equal, in which case access is allowed.

19 Claims, 20 Drawing Figures

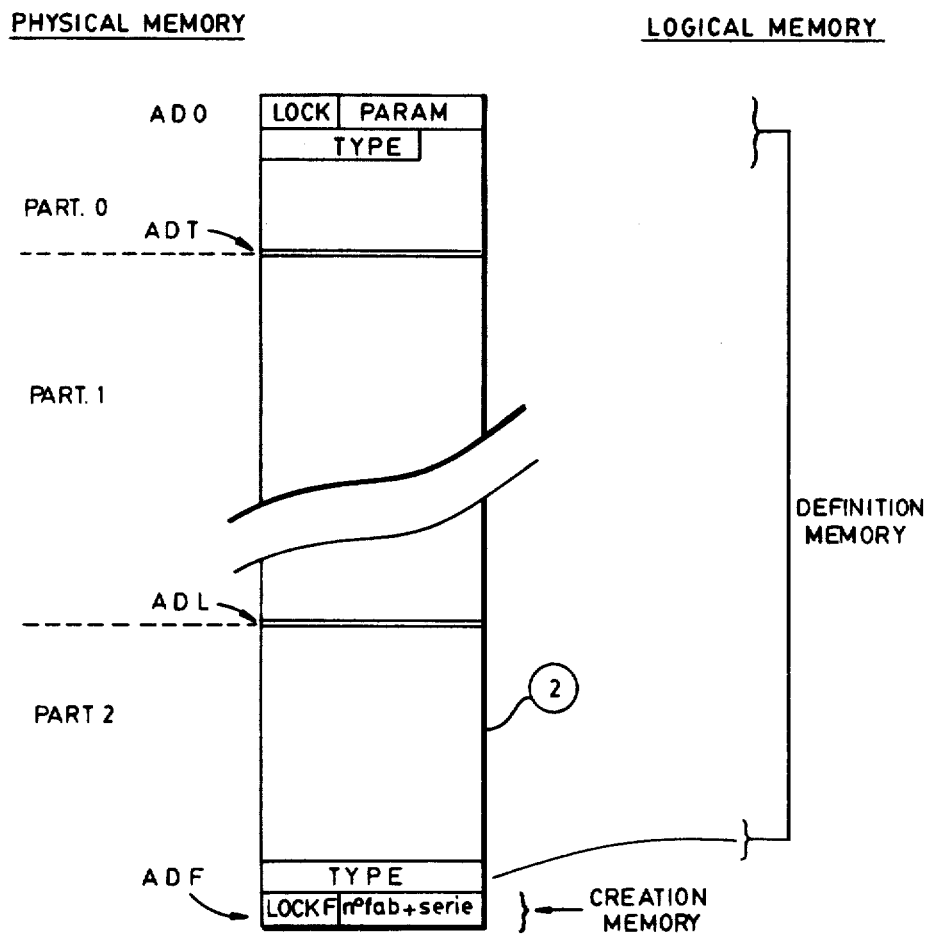

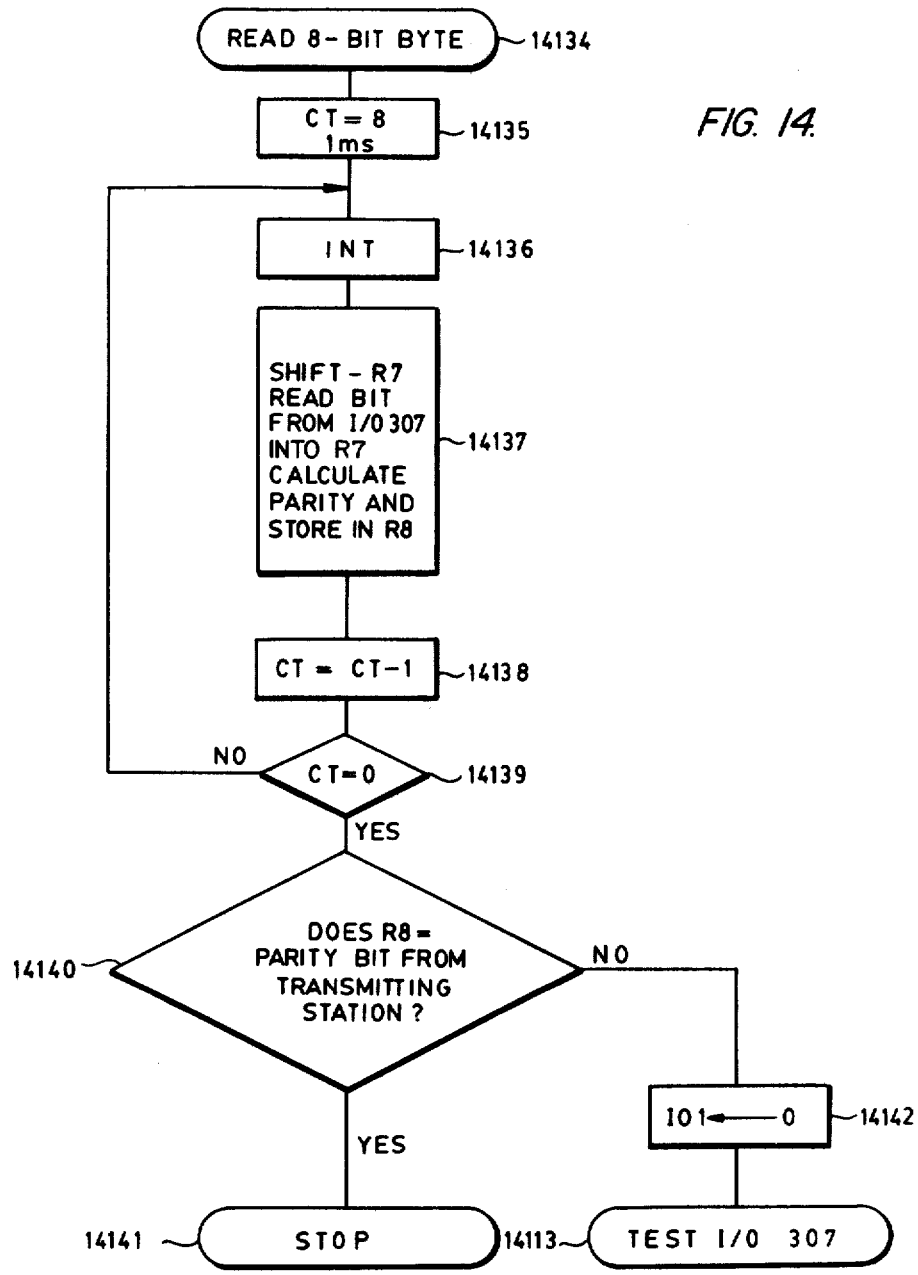

SYSTEM AND METHOD FOR AUTHORIZING ACCESS TO AN ARTICLE DISTRIBUTION OR SERVICE ACQUISITION MACHINE

CROSS-REFERENCES TO OTHER APPLICATIONS

Various aspects of the present system are disclosed in the following commonly assigned copending U.S. patent applications and issued U.S. patents:
(a) Ser. No. 262,606 titled "Portable Machine for Calculation or Data Processing" and filed May 11, 1981 by Michel Ugon, et al.,
(b) Ser. No. 262,607 titled "Device for the Transmission of Signals Between Two Data Processing Stations" and filed May 11, 1981 by Michel Ugon,
(c) U.S. Pat. No. 4,211,919 to Michel Ugon issued July 8, 1980, entitled "Portable Data Carrier Including a Microprocessor",
(d) Ser. No. 302,622 filed Sept. 15, 1981 (Cii/HB case 2446) titled "System for Transmission of Asynchronous Signals Between Data Processing Stations",
(e) Ser. No. 302,595 filed Sept. 15, 1981 (Cii/HB Case 2447) titled "Coupler for Detachable Electronic Media", and
(f) Ser. No. 302,620 filed Sept. 15, 1981 (Cii/HB Case 2448) titled "Office Machine for Data Acquisition or Data Processing".

The subject matter of the above-listed applications and patents are hereby incorporated by reference.

BACKGROUND OF THE INVENTION

The present invention concerns a machine for article distribution and service acquisition, access to which is triggered by the insertion of a detachable medium or data carrier into the machine. The data carrier includes a memory for storing confidential data to allow access to the machine as well as an information processing unit or microprocessor to activate the memory and perform the processing on the data exchanged between the data carrier and the machine.

Service vending machines of the type used for the distribution of bank notes, metal coins, or telephone tokens are well known. These machines are generally activated either by a card with a magnetic track on which is recorded a confidential code, or by a coded badge or metal coins.

These distribution systems make use of a variety of different recognition systems for their security. The best known of these weigh a coin introduced into the machine, perform a magnetic measurement, optically identify figurines, or in the case of badges containing data of recording data on magnetic tracks or on a holographic medium to compare the information read on the badge by the machine with the information supplied by the user requesting a service from the machine.

All these means have the well-known drawbacks of attracting the attention of swindlers seeking by any means to penetrate the secrecy of the data contained in the badges to obtain for themselves at little or no cost the advantages offered by the machines, to the detriment of the person or company providing the services or the legitimate holder of the badge.

SUMMARY OF THE INVENTION

A goal of the present invention is to offer a distribution machine which provides virtually absolute security to the provider of services and to the owner of the badge.

By the use of two detachable data carriers, the system makes it possible to achieve several levels of security. A first security level is achieved by correlation of the data processed by the first detachable data carrier with the data introduced into the system by the person requesting access to the machine. A second level of security is provided by the use of a second detachable data carrier to enable the first detachable data carrier to operate. A third level of security is achieved by the type of link and data exchange implemented between the detachable data carriers and the machine's processing means and, finally, a fourth level of security is achieved by equipping the machine's processing means with means enabling it to consult a file containing a list of invalidated detachable data carriers to prevent access to the machine by detachable data carriers which have been stolen from their legitimate holders.

To achieve these and other objectives which will be apparent as the discussion proceeds, the service or article distribution system according to the invention comprises a first means to receive at least a first detachable data carrier having processing means, data storage means, decision-making means (control) and interfacing circuits. The first means is part of a data station connected to a second means for processing information. A third means for bi-directional communication between the first detachable data carrier and the second means, and a fourth means for delivery of articles or services are part of the data station. The system further includes a means to receive a second detachable data carrier having information processing means, data storage means, decision-making means and interfacing circuits. Access to the second means by the holder of the first detachable data carrier requires the following of a sequence of steps stored in the second data carrier.

The process for the distribution of articles or services at a data station according to the present invention includes the steps of inserting a first detachable data carrier having a processor, a memory and interfacing circuits into a means to receive said first detachable data carrier, generating a random number E in the data station, producing a resultant $R_1 = P_1(S, E, In)$ in the processor of the first detachable data carrier where $P_1$ is a sequence of ordered steps performed on the random number E, a secret code S and an identification code In identifying the detachable data carrier or its holder, where $P_1$, S and In are stored in the first detachable data carrier, producing a resultant $R_2 = P_2(S, E, In)$ outside the first detachable data carrier where $P_2$ is a sequence of ordered steps performed outside the first detachable data carrier on said random number E, said secret code S and said identification code In; testing to see if $R_1 = R_2$, authorizing access to the data station if $R_1 = R_2$, and refusing access to the data station if $R_1 \neq R_2$.

BRIEF DESCRIPTION OF THE DRAWINGS

The invention will be better understood with the aid of the following description given with reference to the drawings.

FIGS. 5 and 6 show an organization of the information-processing content of a detachable medium.

FIGS. 13 and 14 are flowcharts showing the stages in progress of the programs for reading the data transmitted between the processing unit 15 and any detachable medium.

DETAILED DESCRIPTION OF THE PREFERRED EMBODIMENTS

Figure 1:
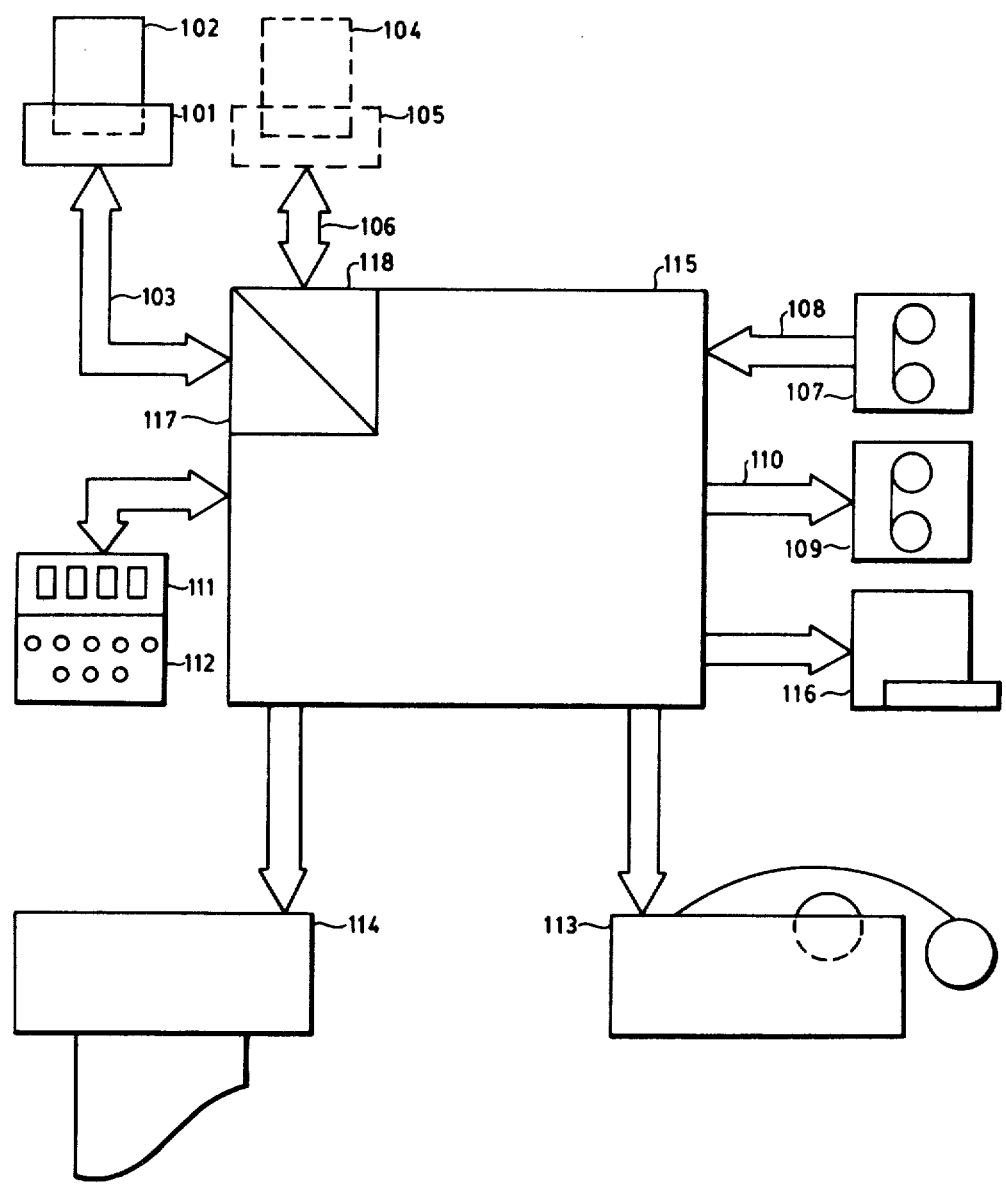
FIG. 1 shows the article or service vending machine according to the invention.

The machine in FIG. 1 is composed of an information processing means 115 connected to several peripheral units. These peripheral units include a means 101 for connection of a first detachable data carrier 102, means 103 for communication between the first detachable data carrier and the information processing means 115, a second detachable data carrier 104, and second means 105 for connection of the second detachable data carrier 104 to means 106 for communication connected with the information processing means 115. Means 107 is for data storage to assure the system's security and is connected to the information processing means 115 by the link 108. Means 109 for storage of the distribution operations is connected to the information processing means 115 by the link 110, whereas a means 111 is for displaying messages transmitted by a data input means 112 external to the system. A means 113 for remote printing made available to the seller of services, a means 114 for local printing made available to the user, and a means 116 for distribution of articles or services are also attached to processing means 115. Programs 117 and 118 are used to accomplish the distribution of articles or services and are stored within the information processing means 115, and are adapted to the nature of the detachable data carriers 102 and 104, respectively. The information processing means 115 shown in FIG. 3 includes at least one microprocessor 301 connected to a system for control of the input-output of incoming and outgoing data from the machine and consisting of a storage system 302, a latch register 303, a counter 304, a memory PROM 307', an I/O port circuit PA 307 connected to two data conductors IO1 and IO2, an identification comparator 309, a random code generator 310, and an interface circuit PIO 308.

The structure of the microprocessor 301 may correspond to that of the 8085 microprocessor marketed by the INTEL company. The microprocessor is connected to the peripheral elements in FIG. 1 107, 109, 111, 112, 113 and 114 by the address lines $A_{8-15}$ and data lines $AD_{0-7}$ through the interface adapter PIO 308. The eight data lines $AD_{0-7}$ are connected to the input of a latch register 303 to address the random access memory 302. This memory RAM2 may have a capacity of 2K bits organized into 256×8 bits. It contains a working area necessary for the processing of the data as well as the programs 117 and 118 necessary for the progress of the operations proper to the machine. In the working area 2 registers R6, R7 and R8 are provided. The register R7 stores the eight-bit byte transferred through the gate PA, and the register R8 stores the parity bit corresponding to the eight-bit byte transferred. The register 303 also selects the control unit 306 by the state of its outputs. The register R6 is reserved for storage of an identification code In, the role of which will be made clear below.

The control unit 206 selects in the data transmission/reception or I/O port circuit 307 the line IO1 when the binary configuration stored in the register 303 is XXXXX001; likewise, it selects in this same circuit the line IO2 for the configuration XXXXX111 in the register 303. It selects the state register 305 when the binary configuration in the register 303 is XXXXX000; it selects the counter 307 when the binary configuration in the register 303 is XXXXX100; it selects the random code generator ME 310 for the binary configuration XXXXX110 in the register 303 and the comparator 309 when the binary configuration in the register 303 is XXXXX101. The counter 304 has its inputs connected in parallel to the data lines $AD_{0-7}$ so as to be able to be loaded at any time by the microprocessor to an initial time value. The C/S state register 305 is also connected to the lines $AD_{0-7}$ to enable it to store an order sent by the microprocessor. This is an eight-byte register the states of which allow selection of either the input/output circuit PA 307 (line C/S1) or the counter CT304 (Lines SC2 and SC3). The line ALE connects the microprocessor 301 to the register 303 and conveys the lock-out signal from the register 303 to authorize or refuse authorization for the addressing of the memory RAM302 and of the control unit 306.

The line IO/M selects either the memory RAM2 or the input/output circuit 307. The lines RD and WR control the reading/writing operation and are connected to the appropriate control circuits of the memory RAM2 and of the circuit 307.

The microprocessor 301 is synchronized by a clock Q which may be a quartz; it transmits clock signals over the line CLK to the input IN of the counter CT304 and to the input Ck of the random code generator GE 310. The line RESET out is connected to the input of the circuit 7 and makes it possible to initialize the system in input/output mode.

The output of the counter CT304 is connected to the input R5T5 of the microprocessor 301 in order to deliver a signal interrupting the processing which is under way when the value of the count initially loaded inside the counter CT304 is exhausted. The microprocessor 301 is likewise connected by its data and address lines to a read-only memory 307' in which are recorded the microprograms necessary for the transmission and reception of data by the machine.

The random code generator GE 310 is activated by the control unit 306 when the binary configuration in the register 303 is XXXXX110 to deliver a random code signal in the direction of the input/output circuit PA307.

The comparator 309 is activated by the control unit 306 when the binary configuration in the register 303 is XXXXX101; its role is to check the access rights of the user's detachable medium.

Figure 2:
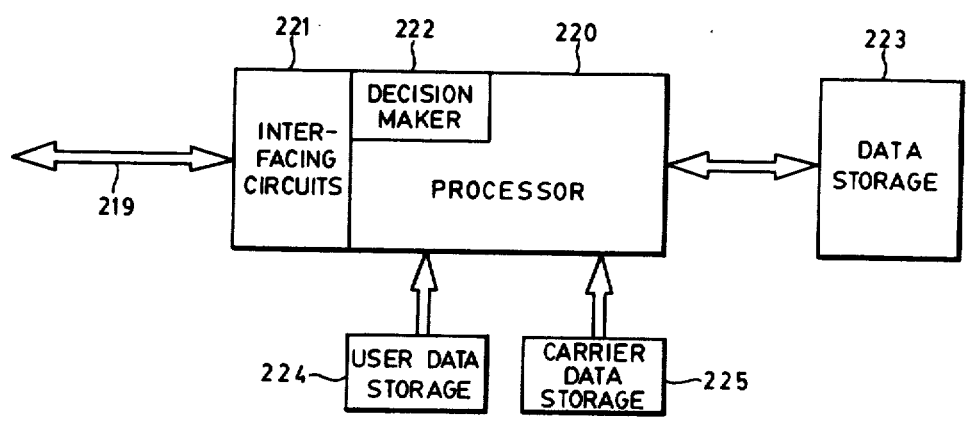
FIG. 2 is a simplified representation of a detachable medium or data carrier.

A simplified representation of the detachable data carrier is given in FIG. 2. Each detachable data carrier includes an information processing means 220 adapted to the distribution type, a means 221 for logical adaptation to allow bi-directional dialogue specific to the distribution type, a decision-making means 222, a storage means (memory) 223, a means 224 for storage of data with respect to the user, and a means 225 for data 225 with respect to the detachable data carrier. The means 219 assures the physical link between the detachable data carrier and the connection means 101 and 105 in FIG. 1. All of the means in FIG. 2 are given in detail in FIG. 4.

Figure 4:
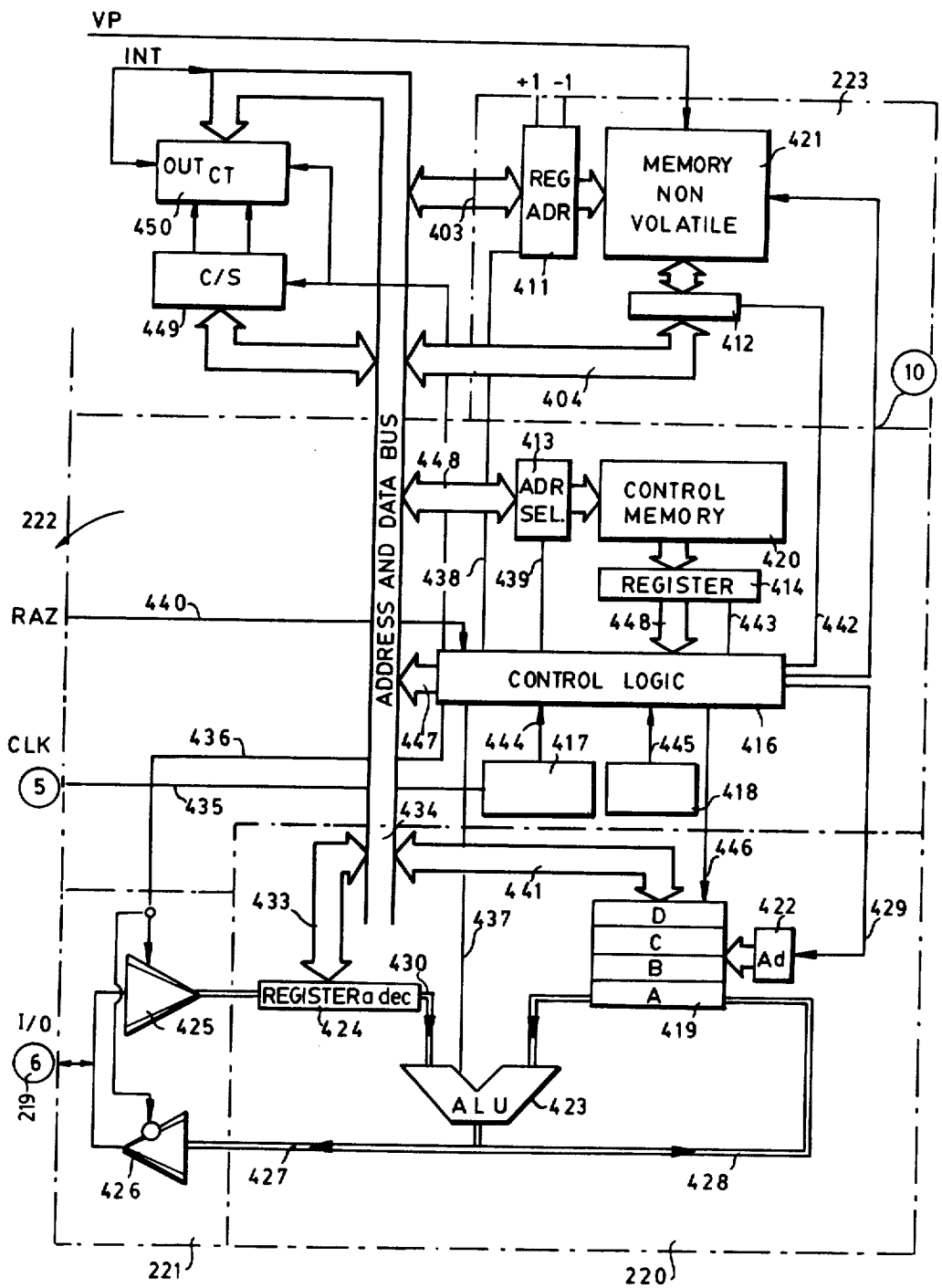
FIG. 4 shows the electronic systems of the machine's detachable medium.

In FIG. 4, the data coming in or going out through the link 219 appear in binary form on the terminal 6 of the data carrier. They enter the information-carrying medium through the gate 425 and are stored in the shift register 424, the gate 425 being activated by the signal passing over the line 436 connecting the gate 425 to control logic 416. The data leave the data carrier through the gate 426, itself activated by the signal present on the line 436 connecting the gate 426 to the control logic 416. Gates 425 and 426 are preferably tri-state output circuits. The information contained in the register 424 then serves as first operand for an arithmetical/logical operation performed in the arithmetical/logical unit 423 activated by the control signal transmitted by control logic 416 over the link 437. The second operand is found in one of the registers A, B, C, D of the register bank 419 addressed by the address selector 422, which is activated by the control logic 416 with the aid of the link 429. The result of an operation performed by the arithmetical/logical unit is transmitted either into the register A of the register bank 419 or towards the terminal 6 of the data carrier through the gate 426. The registers A, B, C, D can also be loaded from the data and address bus 434 through the link 441 under the control of the control logic 416 through the link 446. The bus 434 is also connected by the bi-directional link 443 to the shift register 424, which is then loaded or read on its parallel inputs/outputs. The control logic 416 retransmits the microinstructions addressed by the address selector PC413 into the control memory 420 of the ROM type and read in the register RM414 by the link 448.

The memory 421 is a non-volatile memory. It is addressed by the address register 411 and loaded by the bus 434 and the link 403. The address register 411 checks the information words in the memory 421.

The register 411 is activated by the control signal transmitted over the link 438 connecting the control logic 416 to the address register 411. The address contained in the register 411 can be automatically incremented or decremented by the clock transmitted over the terminal 5 of the information-carrying medium under the control of the control logic 416. The data read in memory 421 are transmitted over the bus 434 through the data register 412 under the control of the control logic 416 and the link 442. All the elements in FIG. 4 taken in isolation are well known in the art. For more details concerning these data carriers, useful reference may be made to U.S. Pat. No. 4,211,919 issued on July 8, 1980 to Michel Ugon.

Figure 3:
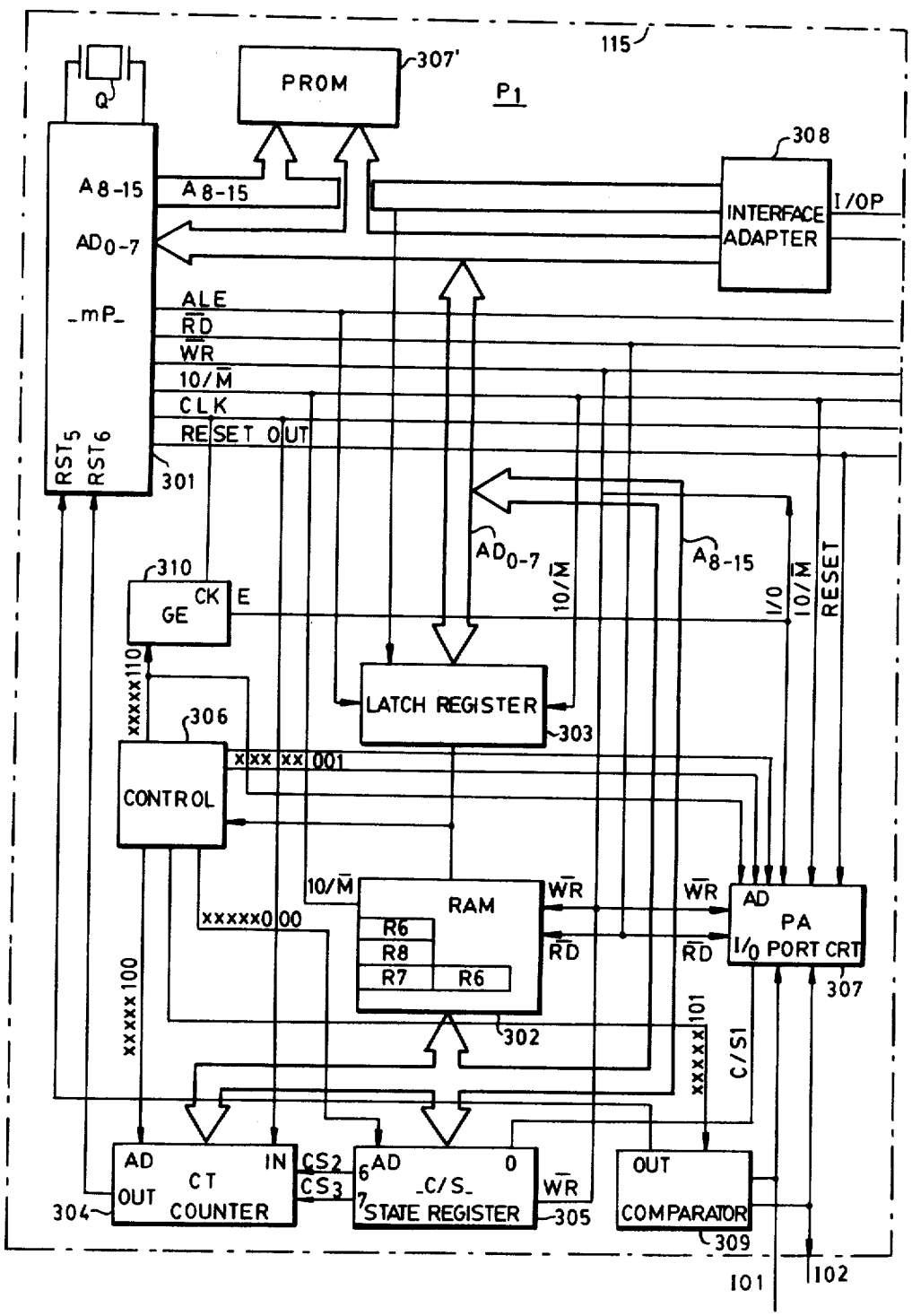
FIG. 3 is a representation of the information processing means 115 in FIG. 1.

The detachable data carrier in addition includes a state register (C/S) 449 and a counter (CT) 450 identical to those shown in FIG. 3.

Figure 6:
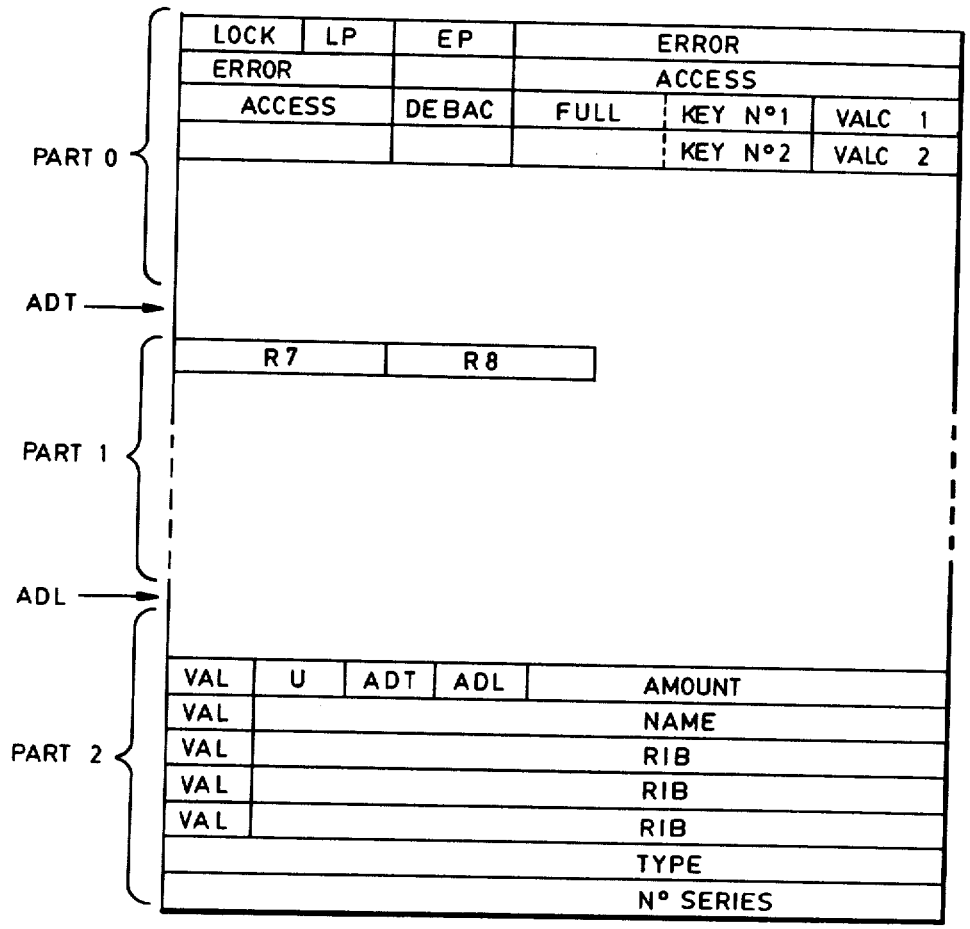

The data content of the data carriers is shown in FIGS. 5 and 6. So as to render the data carriers suitable for all uses, two types of organization of the microprocessors' memory are provided.

The first organization corresponds to the physical organization of the memory and is alone known by the microprocessor.

The second organization corresponds to the logical organization of the memory and meets the needs for operation of the detachable data carrier.

The microprocessor is responsible for making correspondences between these two types of organization.

The physical organization of the memory shown in FIG. 5 has three parts in normal work.

The part 0 begins with the address AD0 and ends with the address ADT-1. It corresponds to the secret part of the memory, for which all external readings and writings are prohibited, and where only internal reading/writing is authorized.

The part 1 begins with the address ADT and ends with the address ADL-1. It serves as working memory for the microprocessor, and all internal or external reading and writing operations are authorized. In particular it includes the registers R7 and R8 used in the transfer of data between the detachable data carrier and the information processing means 115.

The part 2 begins with the address ADL and ends with the address ADF. In this part of the memory, all internal and external writing are prohibited. External or internal reading is authorized.

The logical memory is subdivided into a creation memory and a definition memory.

In order to be operational, the data carrier at the moment of its dissemination must contain data allowing identification of it. This data is contained in the creation memory, which is organized into several areas beginning with the address ADF and making it possible to identify the maker of the data carrier, the series number, a LOCKF area for validating the content of the creation memory and to authorize internal writing. The LOCKF area may for example be 2 bits, and it will be possible to utilize the following code. If LOCKF=11, all reading and writing will be possible within the creation area; in contrast, if LOCKF≠11, the content of the creation area will be validated, but any writing operation will be prohibited.

The working memory (part 1) is specific to the use which the user of the data carrier intends to make. However, whatever the intended use, this memory is itself divided into two parts, one being called definition memory and the other application memory. The size of these areas will naturally depend on the intended use. The definition memory begins with the address AD0. It includes:

a LOCK area of several bits prohibiting external access to the definition memory and validating its content;

a PARAM area, the length of which depends on the type of data medium and which contains the parameters necessary for the functioning of the data carrier;

a TYPE area to define the function of the data carrier, restaurant ticket, electronic stamp, access key in hotels, files, bank note distributing machines, etc.

The application memory consists of the remaining areas. It is usable in general-purpose memory, but the conditions for access to the parts of the physical memory must be respected. Consequently, whatever the applications the invention's data carrier may be given, the secret data will always be located in part 0; the data to be read only will be located in part 2; the data to be stored in the course of normal operation of the data medium will be in part 1. The format utilized for logical data to be stored in the application memory may naturally be of any sort.

An example of subdivision of the logical memory as part of a financial application will now be given, with reference to FIG. 6.

Within this framework, access to the data carrier will require the presence of at least two keys. In the case of banking operation, a key no. 1 will identify the banker (identification code $I_1$) and a key no. 2 will identify the client (identification code $I_2$). The definition memory will then include a type area with a code for designating the financial application of the data carrier. A PARAM zone includes the 2-bit LOCK area. If LOCK=11 access in writing in all parts of the memory is authorized only if the key 1 is present. If LOCK is different from 11, the content of the parts 0 and 2 of the physical memory is validated; access in part 0 and writing in part 2 of the physical memory without the key no. 2 are prohibited. To credit the card, the key no. 1 is necessary. If LOCK is different from 11, the content of the definition memory is validated.

The LP area contains 2 bits. If LP=11, reading is not prevented, but is authorized in the parts 1 and 2 without a key (nonexistent access memory).

If LP≠11, reading is prevented with a key which is necessary to read the parts 1 and 2. This will be the case in most banking operations. (All reading must be accompanied by an access bit pending the error bit in order to make the functioning of the data medium symmetrical.)

The EP area contains 2 bits.

If EP=11, writing is not prevented. In this case, the memory is utilized as a means of storage without protection. This is the case for example where the memory is blank before attachment to the means 101 and 105.

If EP is different from 11, a key is required to write in the part 1 of the physical memory.

The application memory is composed of the identification memory and the financial memory. The data in the identification memory are distributed in the parts 0 and 2. The identification memory in part 0 is composed essentially of an error memory and an access memory. The error memory stores an error bit whenever the data medium is turned on with a false key. The error bits are posted at the ascending addresses starting with the address ADE. When the overflow area DEBE is posted, the data carrier is invalidated.

The access memory exists only if reading of the data carrier is protected (LP≠11), which will be the case in most banking applications. At each reading accompanied by the right key, the microprocessor posts an access bit after the preceding one. The access bits are posted beginning with the address ADA. When the area DEBA is reached, the data medium is invalidated, and no reading can take place.

The identification memory may in addition contain the following areas.

A "full" area indicating that the card is full and that no writing is possible.

A "keys" area containing the code of the banker's key and that of the client. The key no. 1, for example, is assigned to the banker, while the key no. 2 is assigned to the client.

A VALC 1 area permits defining the validity of the key no. 1. If VALC1≠11, the key is valid.

A VALC 2 area permits defining the validity of the key no. 2. If VALC2≠11, the key is valid.

When LOCK is different from 11, the key no. 1 allows only writing of all information which may increase the purchasing power of the data carrier, in particular any form of credit. In contrast, the key no. 2 is used by the owner of the data carrier to validate debit operations (protected reading or writing).

The identification memory in part 2 of the physical memory begins immediately before the definition memory (type area) in the direction of the descending addresses. This variable-length area allows storing of data permanently. It includes:

an address area containing the pointer ADT containing the outgoing address from the working area and the pointer ADL containing the address of the reading area;

an RIB area corresponding to the statement of bank identity and the date of transmission of the printing device;

an NOM area corresponding to the name of the holder of the data carrier;

an n-bit "amount" area;

a "U" unit area, which with the amount area makes it possible to find out the initial amount of the data carrier.

For example, if the unit area is 500 F, the initial amount which the logging medium can contain will be $(2^n-1)$ (500 francs).

The financial memory is stored in a working area in the part 1 of the physical memory between the addresses ADT and ADL. Debits are posted directly from the address ADT in the direction of ascending addresses. Credits are posted from the address ADL in the direction of descending addresses. Thus, debits and credits fill the memory while progressing towards one another.

Taking into account the intended applications, the operations of the system shown in FIG. 4 can be summarized as follows:

sequential reading and writing of the memory 421 in the authorized areas from a given address;

acquisition and verification of an enabling key by comparison with a word inaccessible outside the data medium and written in the secret area of the application memory;

authorization or prohibition of reading and writing;

systematic self-checking of writing in the memory;

internal storage control of access errors and/or successes;

placement of the preceding functions out of service by an error number set in the part 0.

Figure 7:
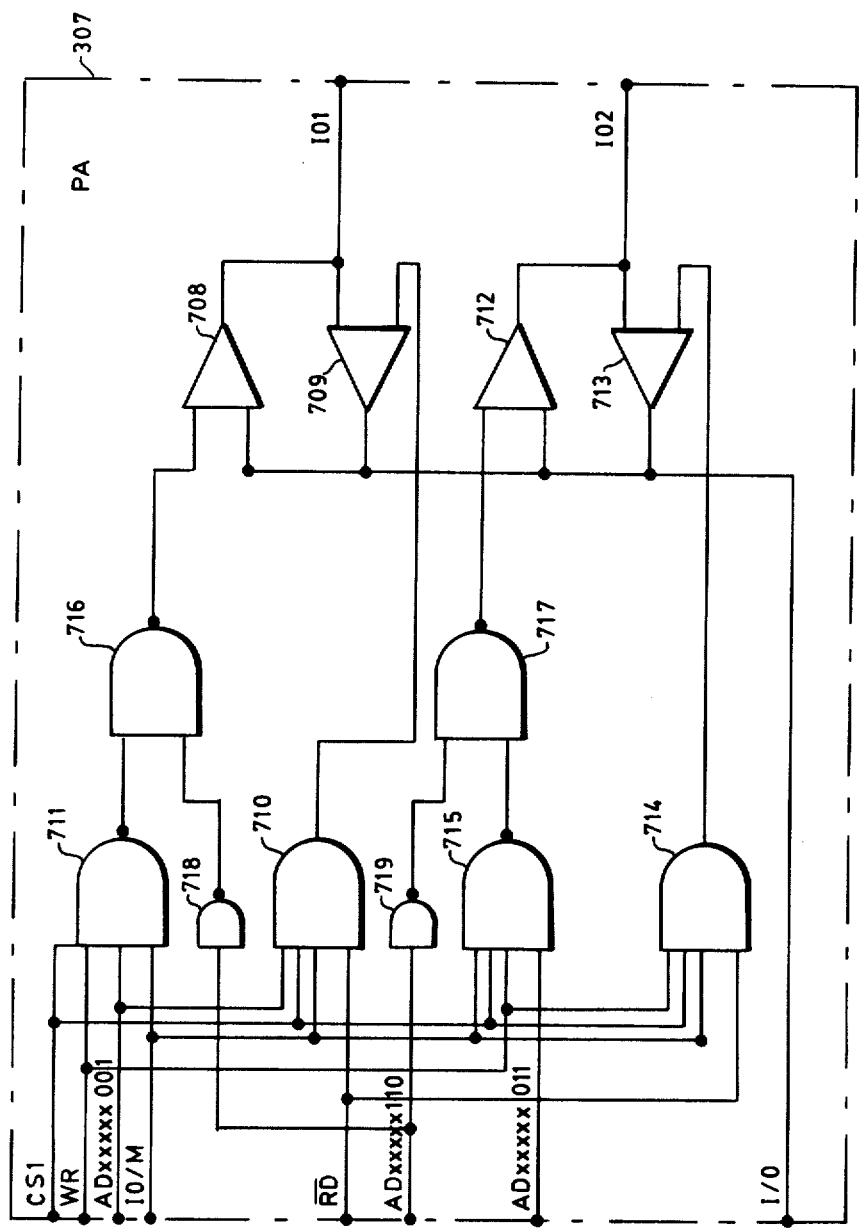
FIG. 7 shows the circuits necessary for bi-directional transmission of messages according to the invention.

FIG. 7 is a representation of the circuit 307 in FIG. 3. This circuit is composed of three-state circuits or amplifiers 708, 709, 712 and 713, equipped with their control gates. The output of the amplifier 708 is connected to the input of the amplifier 709. These two amplifiers are connected to the conductor IO1 so as to be able to utilize the amplifier 708 to transmit the data present on the line (I/O) over the conductor IO1 and to utilize the amplifier 709 to receive the data transmitted over the conductor IO1 to retransmit them over the line I/O.

Likewise, the output of the amplifier 712 is connected to the input of the amplifier 713. The two amplifiers are connected to the conductor IO2 so as to be able to utilize the amplifier 713 to receive the data transmitted over the conductor IO2 and transmit them over the line I/O.

The conductors I-1 and IO2 assure a link with each of the inputs 6 of the detachable data carriers, and the line I/O assures a link to the data line of the microprocessor 301. All of the NAND gates 711, 716 and 718 activate the amplifier 708 when they are activated either by the combination XXXXX001 received from the control unit 306, by the signal IO/M transmitted by the microprocessor 301, by the signal WR transmitted by the microprocessor 301, and by the signal CS1 transmitted by the state register 305, or by the combination ADXXXXX110 received by the control unit 6. The combination ADXXXX110 is used for the transmission of the random code E transmitted by the random code generator GE310. The combination XXXXX001 is used to activate the other writing operations in each of the detachable data carriers.

The gates 710 and 714 activate the amplifiers 709 and 713, respectively, and are used to activate the data reading operations in each of the detachable data carriers 102 and 104.

Figure 8:
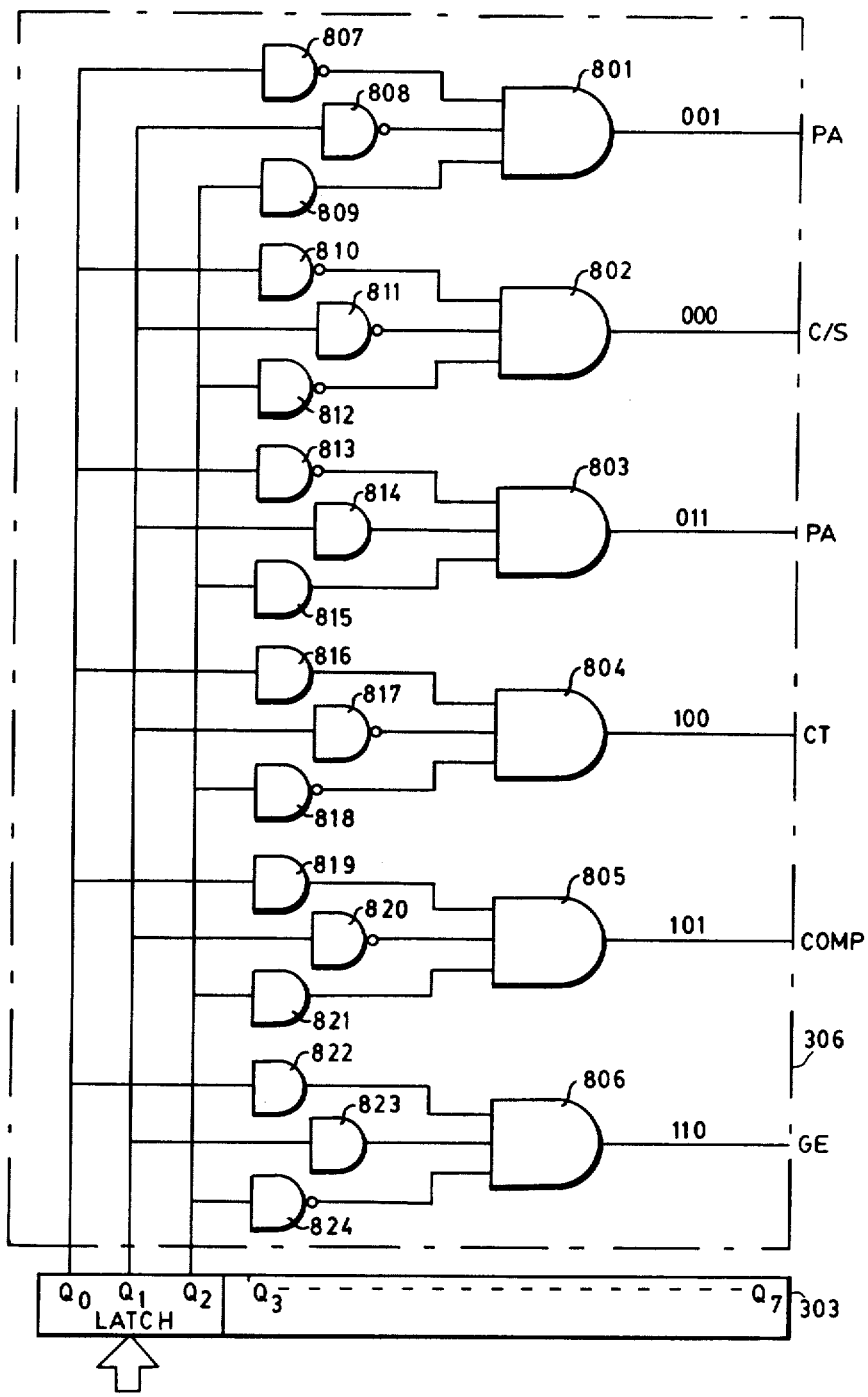
FIG. 8 is a representation of the control circuits in FIG. 3.
Figure 9:
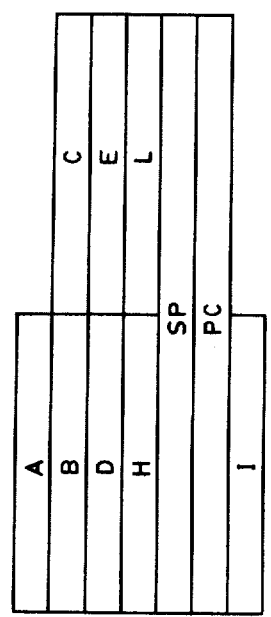
FIG. 9 shows the working registers of the 8085 microprocessor marketed by the INTEL company and used to constitute the processing unit in FIG. 3.

FIG. 8 shows a realization of the control logic 306. The output of the AND gate 801 activates the I/O circuit PA307 when the outputs Q0 Q1 and Q2 of the register 303 have the binary combination Q0*.Q1*.Q2. The output of the AND gate 802 activates the C/S state register for the combination Q0* .Q1* .Q2*. The output of the AND gate 803 activates the gate PA307 for the combination Q0* .Q1 .Q2. The output of the AND gate 804 activates the counter CT 304 for the binary combination Q0 .Q1* .Q2*. The output of the AND gate 805 activates the comparator 309 for the combination Q0.Q1*.Q2, and finally the output of the gate 806 activates the random code generator GE310 for the binary combination Q0.Q1.Q2*. FIG. 9 shows a representation of the working registers contained in a microprocessor of the 8080 or 8085 type used in realizing the microprocessor 301. The register A corresponds to the accumulator.

The registers B, C, D, E are working registers and are specialized for receiving data. The register H and L are address registers. The register SP contains the address of a stack register and is used during interruptions in processing to point towards the address of a stored stack to save the content of certain registers in the microprocessor or to resume interrupted processing. The register PC is the program counter and in the execution of a program allows going on to the next instruction. The register I is an index register which permits addressing data by indexing.

Details relating to the operation of these registers are given in the book entitled "Les Microprocesseurs" by Pierre Le Beux and Rodnay Zaks, published by the Sybex publishing company, 313 rue Lecourbe, 75015 Paris-C 1977.

Figure 10:
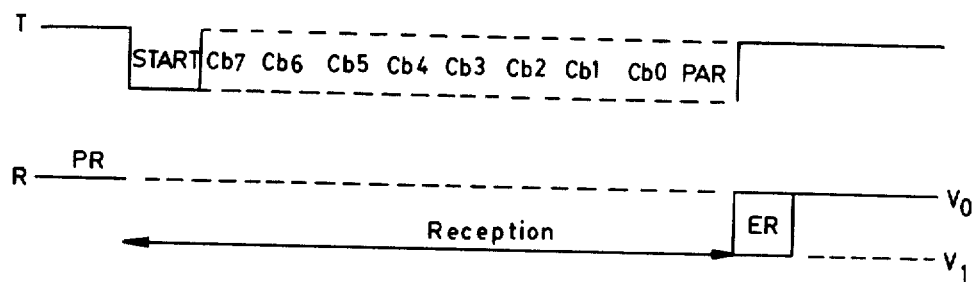
FIG. 10 is a timing chart showing transmission of an eight-bit byte message.

FIG. 10 is a timing diagram of a message transmitted over either of the conductors IO1 and IO2. Transmission of a message is serial and includes eight eight-bit bytes transmitted in 10 intervals. The first interval is used to transmit the message start signal, or START signal. The intervals 2 to 9 are used for transmission of the message proper, and the tenth interval transmits the messages's parity bit.

The receiving data station (receiver) receives the signals transmitted in these 10 intervals and performs a parity check during the eleventh. The receiver signals the transmitting data station (transmitter) that it is ready to receive a message by placing the conductor 13 at a potential VO (signal PR). This signal is positioned at least one interval before transmission of the START signal. After reception and checking, the receiver positions the state of the conductors IO1 and IO2 at a potential V1 for the duration of an interval. If the parity check performed on the message reveals that there has been an error, the line is returned to the starting potential VO. If the transmission took place correctly, the receiver (R) holds the line at V1 for an interval.

Figure 19:
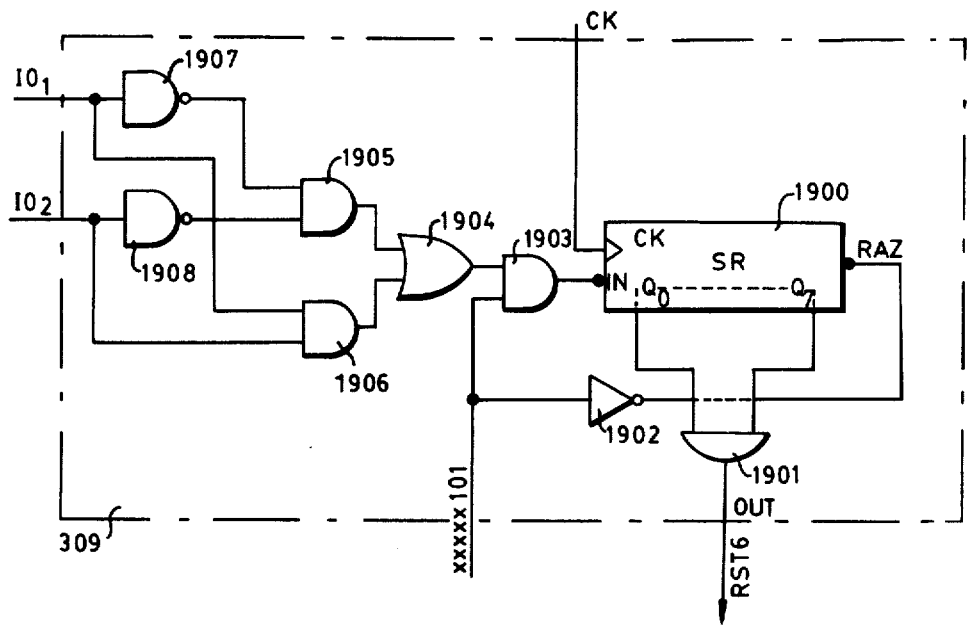
FIG. 19 is a representation of the comparison circuit in FIG. 3.

The comparator 309 is shown in FIG. 19. It is composed of a shift register SR1900, progression of which is timed by the clock signal CK transmitted by the output CLK of the microprocessor 301. The information bits enter through its IN by way of the output of the gate AND 1903, one input of which is activated by the combination XXXXX101 applied to the input of the control unit 306 and another input of which is activated by the output of the gate OR 1904.

The gate OR 1904 receives over a first input the result of the logical AND operation formed on the complement of the information bits present on the lines IO1 and IO2, and over a second input the result of the logical AND operation formed on the true value of the information bits present on the lines IO1 and IO2. Thus, when at a given instant the two bits present on the lines IO1 and IO2 have the same value, a bit of information having a logical value 1 is transmitted to the input of the shift register SR1900; in contrast, when the values of the two bits on the lines IO1 and IO2 are different, a zero is then transmitted to the input of the shift register SR 1900. In the case of simultaneous transmission of an eight-bit byte of information over each of the lines IO1 and IO2, equality between these eight-bit bytes is achieved when all the bits to be stored outside the register SR 1900 have the value 1. This equality is detected at the output of the AND gate 1901, each input of which is connected to each output respectively of the register SR 1900, and the output of which is connected to the input RST6 of the microprocessor 301 so as to cause an interruption in processing in the latter.

Figure 20:
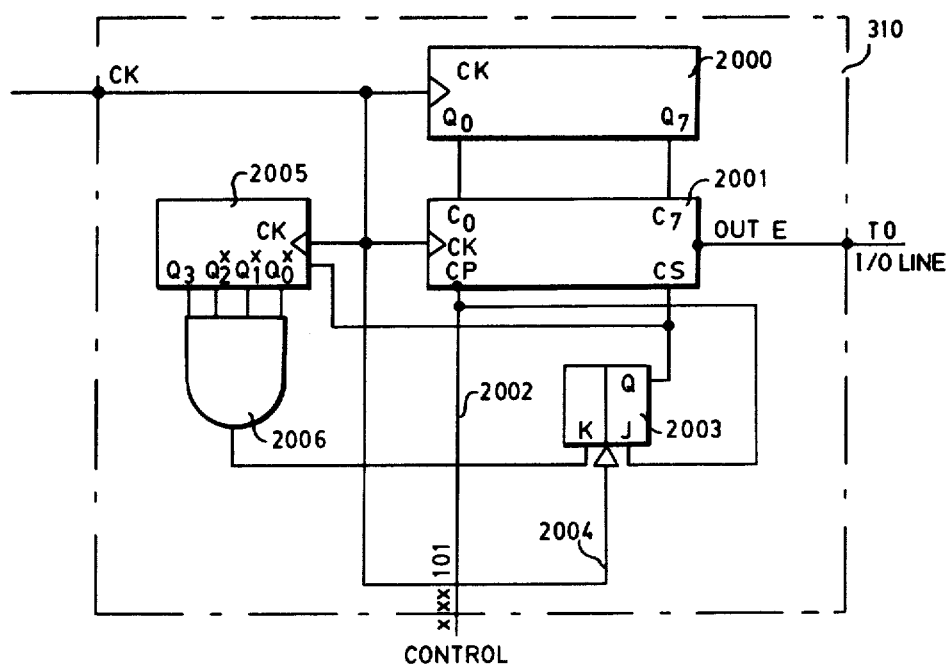
FIG. 20 is a representation of the random code generator in FIG. 20.

The preferred construction for random code generator 310 is shown in FIG. 20. Random code generators of other types known in the art may be used. It is composed of a binary ring counter 2000, in which progression takes place under the control of the clock signals CK transmitted to the output CLK of the microprocessor 301 and a shift register 2001 in which the parallel inputs C2 to C7 are connected to the outputs Q0 to Q7 of the counter 2000.

The state of the counter 2000 is transferred to the shift register 2001 when the combination XXXXX110 is applied to the input of the control logic 306. This state is then transferred serially by the output OUT of the shift register 2001 over the line I/O of the processing means 115 when the series control input CS is activated by the output Q of the flip-flop 2003. The flip-flop 2003 is activated by the combination XXXXX110 and is returned to the zero state when the eight bits composing the signal E have been transferred. The number of bits transferred is counted by the counter 2005, which controls resetting of the flip-flop 2003 to zero through the gate AND 2006.

The eight bits of information constituting an eight-bit byte and transferred serially over the conductors IO1 and IO2 are stored successively in the register R7 of the memory RAM2 or in the register R7 of the nonvolatile memory 421 when they are received by the receiving microprocessor.

This transfer is effected by successive reading of the I/O circuit PA307, successive transfer in the accumulator register of the receiving microprocessor, and transfer after alignment of the accumulator register to the register R7 of the memory RAM2 or the memory 421. As each new bit is transferred, a parity bit is calculated taking into account the parity of the bits already received. The result of the calculation is consigned to the register R8 of the memory RAM2. The end-of-message bit also serves as parity bit for the message transmitted and is compared to the parity bit calculated and stored in the register R8. If there is equality of value between the two bits, the transmission will be recognized as correct. If not, this anomaly will be signalled to the transmitting processor by transmission at the level of the signal ER.

Figure 11:
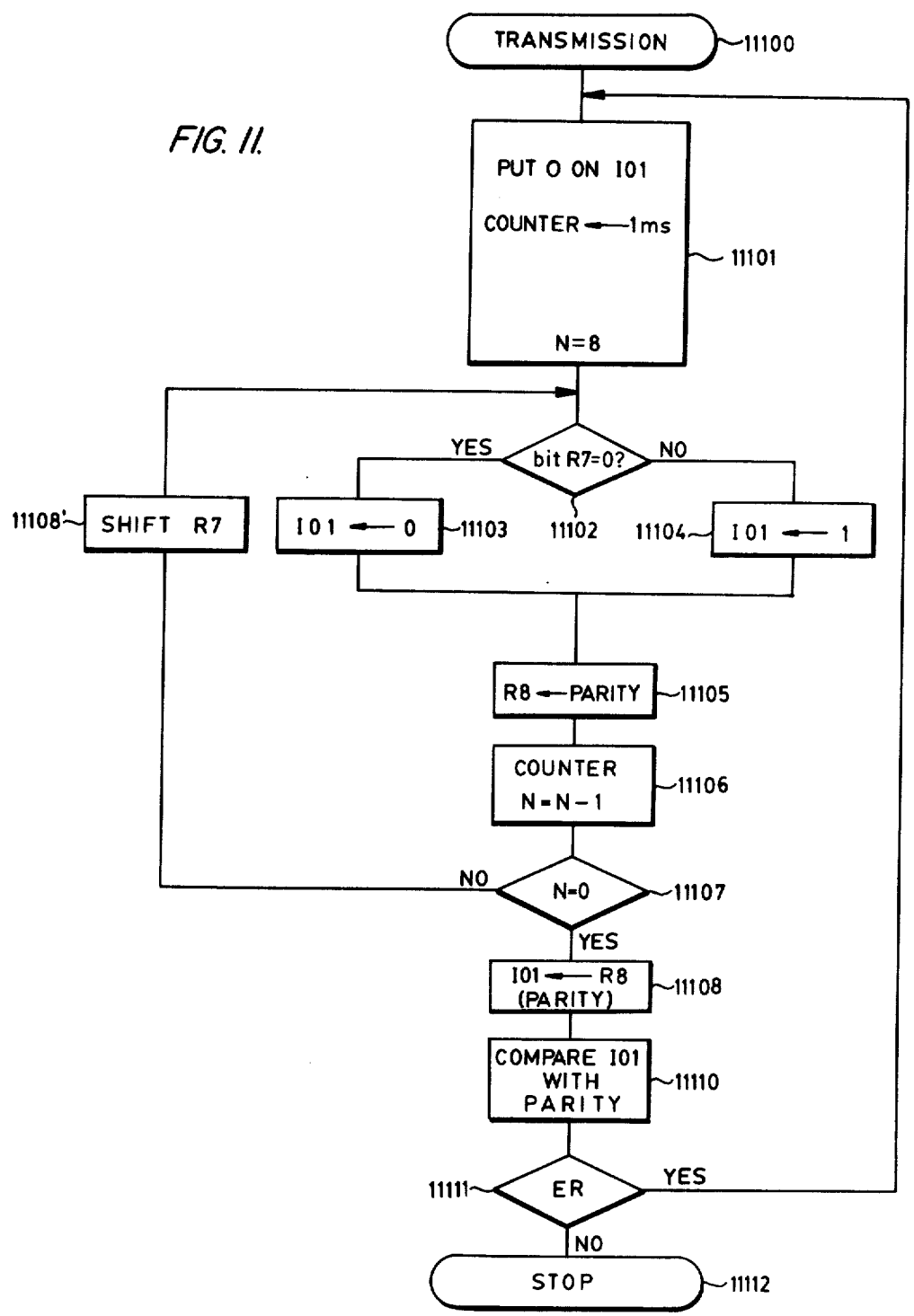
FIG. 11 is a flowchart showing the stages in the progress of the data transmission program on the transmission line between two transmissions.

The flowchart in FIG. 11 shows the stages necessary for the sequence of the program executed by the transmitting processor. At the stage 11101 the transmitting microprocessor places the lines IO1 and IO2 at the logical state 0 and changes the counter CT 304 to the value of time necessary for transmission of the START signal and the following eight-bit byte, as shown in FIG. 10. For convenience only IO1 is listed in the drawing; the same operations may also occur with respect to IO2. The end of transmission of the START signal causes an interruption in the microprocessor. The eight-bit byte to be transferred contained in the register R7 of the memory RAM2 or the memory 421 is then loaded into the accumulator register of the transmitting microprocessor to test the value of the first bit (stage 11102). The I/O circuit PA 307 or 426 transmits the corresponding value of the first bit read in the register R7 over the conductors IO1 or IO2 in the stages 11103 and 11104. At the stage 11105 the parity bit corresponding to the message to be transmitted is calculated and transmitted into a bit position in the register R8 of the memory 302 or the memory 421. At the stage 11108' the content of the register R7 is shifted by one binary position towards the left.

This process is repeated at each interruption signal delivered by the counter. It ends when all the bits in the eight-bit byte have been successively transferred. The stage 11107 consists of verifying that all the bits have been transferred. At the stage 11108 the parity bit stored in the register R8 is in turn transferred. The receiver can then compare the parity of the bits in the eight-bit byte received with the parity bit which it has also received at stage 11108. If they coincide, the transmission cycle is completed (stage 11112). If they do not coincide, the receiver signals the transmitter that there is an error (signal ER FIG. 10) and a new transmission cycle is performed starting with the stage 11101.

Figure 12:
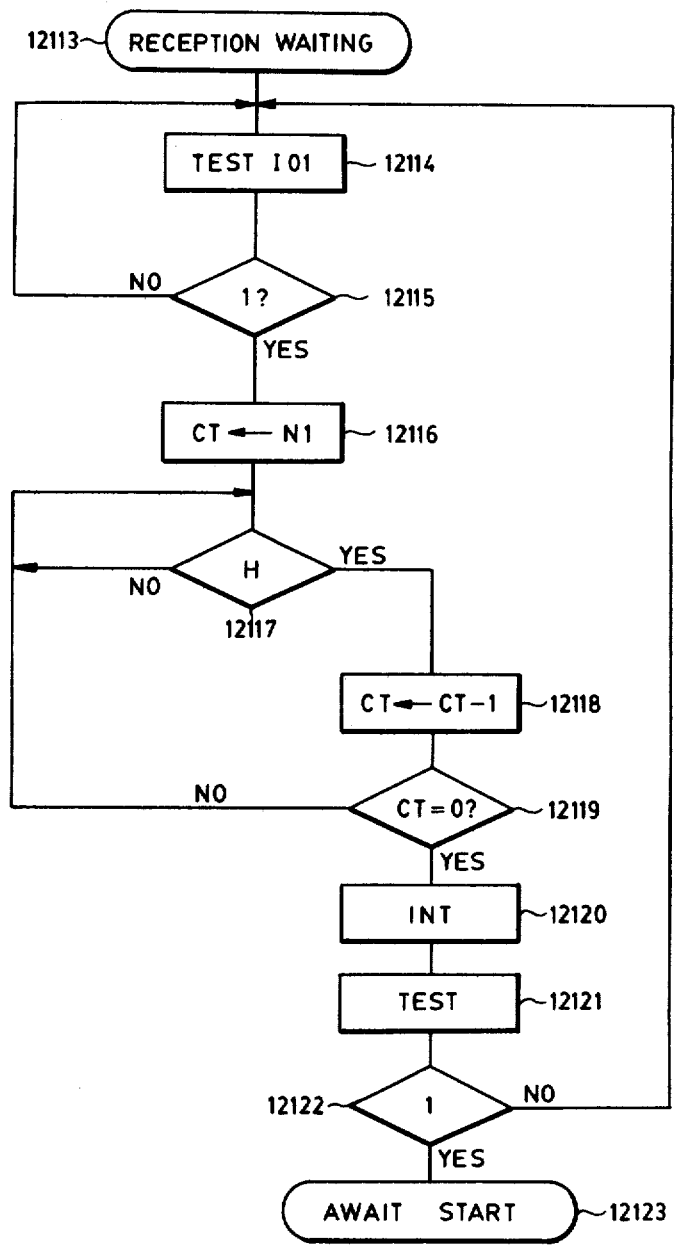
FIG. 12 is a flowchart showing the stages in the progress of the data testing program on the tranmission line between two transmissions.

FIG. 12 is a flowchart showing the operations performed by the receiver when it is awaiting a message from the transmitter. These tests are done by repeated readings of the state of the transmission lines IO1 or IO2. At the stage 12114, the I/O circuit PA307 or the output of the amplifier 425 is read repeatedly so long as the state of the line IO1 or IO2 is at 0. When the state of the line becomes 1 (stage 115), the counter 304 is loaded to a predetermined value of time (stage 12116) so as to cause an interruption in the processing of the microprocessor and cause a reading of the state of the circuit PA307 or the amplifier 425 when this time value is exhausted. This test takes place at the stage 12122. If at this stage the state of the gate is at 1, the receiver awaits the START signal. In contrast, if the state of the gate is at 0, it must be concluded that the test undertaken at the stage 12115 was caused by noise. The receiver then returns to the stage 12114.

Figure 13:
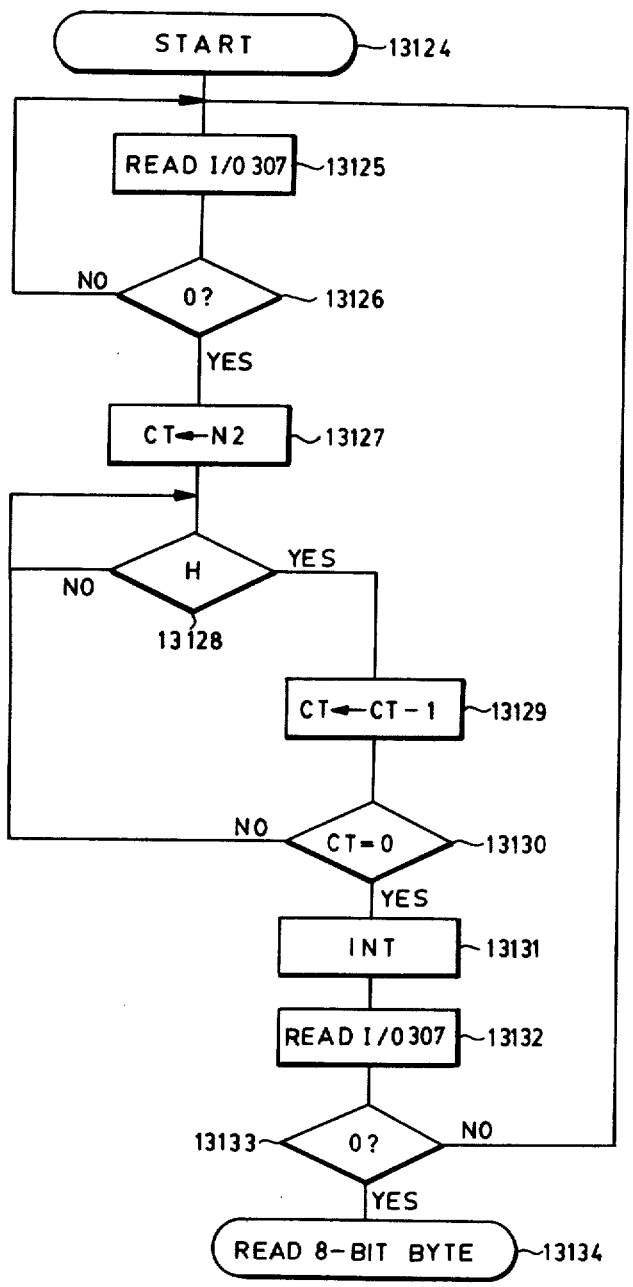

FIG. 13 is a representation of the reception sequence of the START signal. At the stage 125 the receiver reads the state of the gate 307, specifically the state of tri-state amplifier 425. The counter CT4 is loaded to a predetermined time value $N_2$ as soon as the state of a conductor IO1 or IO2 takes the value 0. This time value is decremented at the stage 13129 to the cycle of the internal clock of the microprocessor, which then performs a reading operation on the I/O circuit PA307, specifically the circuit 425. If at this instant in the sequence the conductor IO1 or IO2 still has the value 0, there is confirmation that this is in fact a START signal and not a noised induced yes to step 13126. Reading of the eight-bit byte can then be performed (stage 13134).

FIG. 14 is a representation of the reading sequence of an eight-bit byte. The counter CT4 is loaded to a time value corresponding to the time necessary for reading the eight bits transmitted. If the duration of a bit is 1 ms, the value of the transmission time loaded into the counter 304 is 8 ms. Each transfer of a bit causes an interruption in the receiving microprocessor (stage 14136) to authorize it to store in the register R7 the bit read on the I/O circuit 307 or on the amplifier 425, to perform a parity calculation on the bits already received with the one just received, and to load the parity calculation result into the register R8 (stage 14137). When an eight-bit byte has been transferred into the register R7, the counter CT 304 takes the state 0 at the same time as the parity bit transmitted by the transmitter is received. A comparison then takes place between the bit transferred by the transmitter and the bit previously calculated and stored in the register R8 of the receiver (stage 14140). If the two parity bits correspond, the transmission is made without error and is considered finished. If there is a difference in state between the two parity bits, there is a transmission error. This error is signalled to the transmitter by forcing the conductor IO1 or IO2 to the state 0 (stage 142), and the test sequence of the gate 307, specifically the amplifier 425, is resumed (stage 113).

The scanning sequence for the state of the conductor IO1 or IO2 and the delivery sequence for the interruption signals allow matching of the sending of messages to be transmitted with the functioning of the receiving station. Thus a double level of asynchronous operation is achieved independent of the functions dealt with at the level of each station, for aside from the periods of interruption, the stations can be given over to performing other tasks completely independent of one another, and independent of the receiver's programs since the interruptions can arise at any moment.

The sequences just described can be achieved by means of the following list of instructions stored in the memory 307' in FIG. 3 or in the memory 420 of the detachable data carrier, using the instructions of the INTEL 8080 or 8085 microprocessor.

| | Instructions | Remarks |
|---|---|---|
| | TRANSMISSION | |
| 100 | OUT PA | Gate A ← 0 |
| 101 | LHLD | |
| 102 | MOV A,M | (Initialization of the meter CT4) |
| 103 | MOV CT,A | CT ← A |
| 104 | LHLD | |
| 105 | MOV B,M | B ← 0 |
| | INT | (Interruption computer meter) |
| 106 | LDA | A ← 8 |
| 107 | SBB B | |
| 108 | JZ NEXT (113) | |
| 109 | LDA | A ← R7 |
| 10A | OUT Gate A | |
| 10B | MOV C,A | C ← A |
| 10C | ANA | Mask 1 000 000 |
| 10D | XRA,M | Parity calculation A $A_0 \leftarrow R_8 \oplus A_0$ |
| 10E | LHLD | |
| 10F | MOV M,A | parity in R8 |
| 110 | MOV A,C | A ← R7 |
| 111 | RLC | shift R7 |
| 112 | MOV M,A | R7 ← A |
| 113 | LDA | A ← R8 |
| 114 | OUT Gate A | |
| 115 | NOP | |
| 116 | IN GATE A | |
| 117 | CPI | If 1 = error |
| 118 | JNC NEXT (100) | |
| 119 | RET | End |
| | GATE TEST | |
| 11A | IN Gate A | $A_0 \leftarrow$ State of PA7 |
| 11B | CMP M | Compare $A_0$ to 1 make S = 1 in PSW if # |
| 11C | RM NEXT = (11A) | if S = 1 return to 11A |
| 11D | LHLD | Load H. L with content of the memory found in addresses qq and PP. A N |
| 11F | MOV CT,A | CT ← N |
| 120 | RET | |
| | START | |
| 121 | IN Gate A | |
| 122 | CMP M | Make S ← 1 in PSW if # |
| 123 | RM NEXT (121) | Return to 121 if S = 1 |
| 124 | LHLD | |
| 125 | MOV A,M | |
| 126 | MOV CT,A | |
| 127 | RET | |
| | INT. START | |
| 128 | PUSH PSW | Save A and PSW |
| 129 | IN GATE A | |
| 12A | CMP M | Make Z = 0 of PSW f gate = 0 |
| 12B | RM NEXT (128) | If Z = 1 return to 128 |
| 12C | CNZ Reading 8-bit byte | |
| | READING 8-BIT BYTE | |
| 12D | LHLD | |
| 12E | MOV A,M | |
| 12F | MOV CT,A | |
| 130 | LX1 B | B ← 0 |
| 131 | RET | |
| | INT | |
| 132 | LHLD | |
| 133 | MOV A,M | |
| 134 | RLC | |
| 135 | MOV D,A | |
| 136 | IN Gate A | |
| 137 | MOV E,A | |
| 138 | LHLD | Addressing R8 |
| 139 | XRA | Parity in A |
| 13A | MOV M,A | Parity in R8 |
| 13B | MOV AE | |
| 13C | ORA D | |
| 13D | LHLD | Addressing R7 |

-continued

| | Instructions | Remarks |
|---|---|---|
| 13E | MOV M,A | R7 ← A |
| 13F | INX B | |
| 140 | LDA | A ← 8 |
| 141 | SBB B | |
| 142 | JP | Z ← 1 of PSW over = 0 |
| 143 | RET | |
| 144 | MOV A,E | |
| 145 | LHLD | Addressing R8 |
| 146 | CMP M | |
| 147 | JZ NEXT (149) | Make Z = 1 ds PSW if γ there is equality |
| 148 | END | |
| 149 | OUT Gate A | |
| 150 | CALL gate test | |

Figure 15:
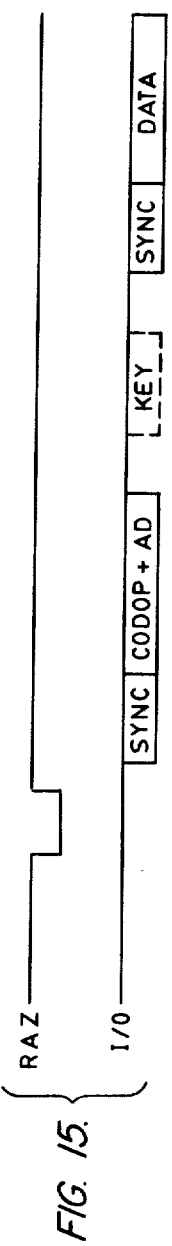
FIGS. 15 and 16 illustrate the functioning of a detachable medium in its memory reading mode.
Figure 16:
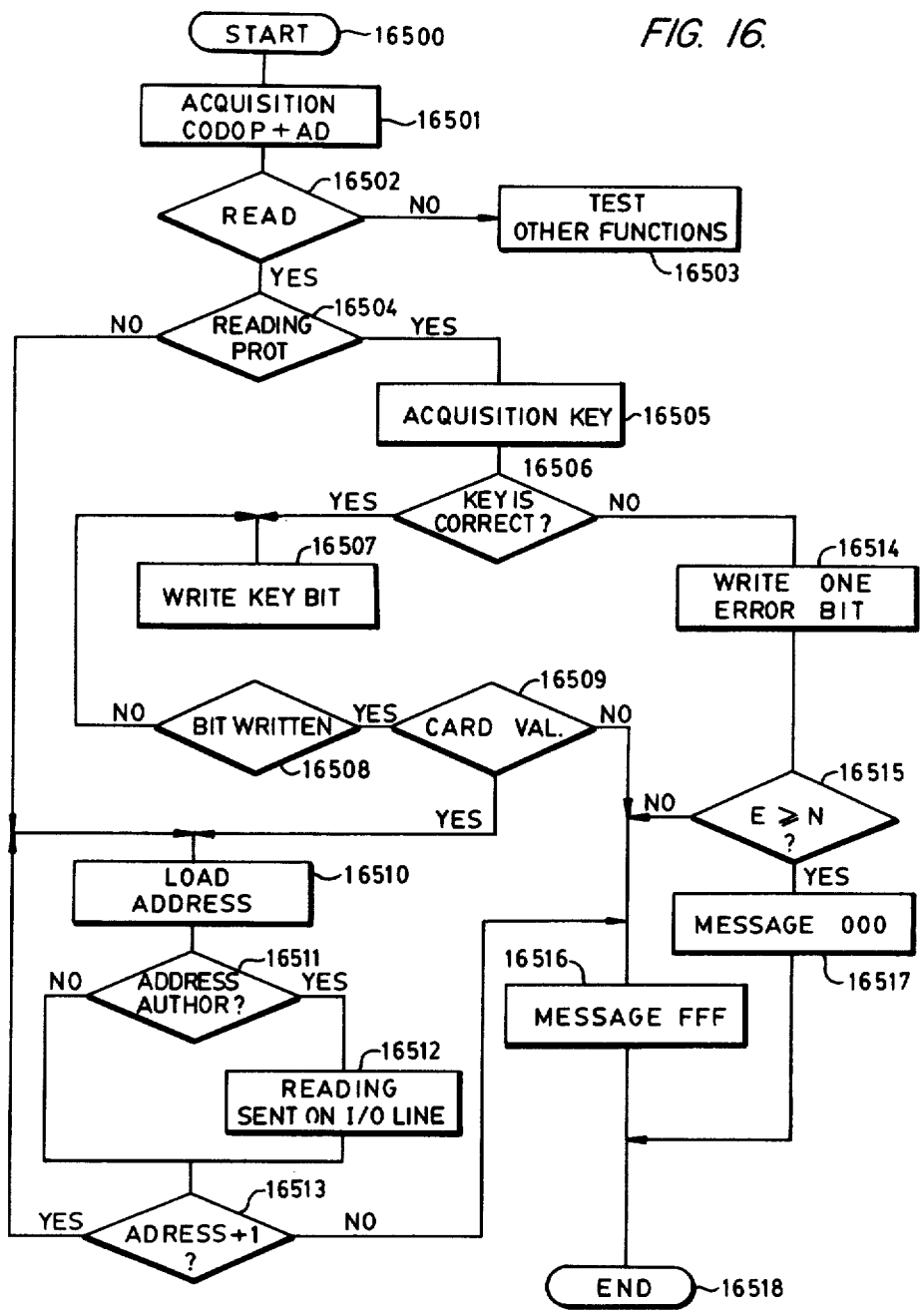

FIGS. 15 and 16 illustrate the functioning in memory-reading mode. In the diagram in FIG. 15, the signal RAZ initializes the control logic 416 which authorizes the transfer of the message arriving over the line I/O in the register T.

The reading order appears in the form of a signal SYNC which precedes the operation code CODOP and the address bits. The codes used are naturally to be defined for each application.

The CODOP order and the address are received by the processing unit, which recognizes by a test on the word CODOP and the bits LP that this is a reading operation, and if the reading is protected or authorized. In the diagram in FIG. 16, acquisition of the message CODOP+AD occurs in stage 16501. The test takes place in stages 16502 and 16504. If this is an unprotected reading operation, the register 411 in FIG. 4 is loaded at the stage 16510 by the address word, which follows the sending of CODOP over the line I/O. Then at the stage 16511 tests are done to verify that the reading address is within the authorized storage area. In particular, the microprogram stored in the control memory 420 will verify that the address word received is greater than the address AD, since only an external reading is authorized in the parts 1 and 2 of the physical memory. If the address is greater than the address ADT, the datum is then read in the memory 421 and loaded into the register 412 to then be transmitted through the bus 434 over the output line I/O. The address register is then incremented or decremented by one unit according to the content of the CODOP code by return of the program to the stage 16510. If the address AD is smaller than the address ADT (address in the part 0), the address register 411 is incremented by one unit until its content reaches the value ADT. In this way, the entire memory except for the part 0 can be read by a device connected to the data medium in the ascending or descending order of the addresses.

If the reading is protected, the tests are done on the "CODOP", and the bits LP must coincide, and in this case acquisition of a key at the stage 16506 is necessary. In the case of a bank-note machine where two keys are necessary, the content of the CODOP code specifies the type of key which must be used so that the reading operation can be performed. The key received over the line I/O is then compared to one of the two keys contained in the identification memory. If they coincide, the transmitted key is the right one, and a bit is then posted in the access memory (stage 16507). A check on the writing of this bit is then done at the stage 16508, and a return to the stage 16507 is necessary if the bit is not written. As soon as the writing has in fact taken place, tests on the areas DEBAC, MISTAKE or FULL are performed at the stage 16509 to verify that the data carrier is still valid. If the data carrier is not valid, transmission of a code 000 will take place on the line I/O. If the medium is recognized by the program, the address AD is loaded into the address register 1 and the stages 16510 and 16513 are executed.

If at the stage 16506 the key received over the line I/O proves to be incorrect, an error bit is then stored in the error memory (stage 16514). When the error bit is posted, a test takes place at the stage 16515 to verify whether the number or errors recorded is not greater than the authorized number N of errors. If the number is lower, the message FFF is then transmitted over the line I/O. In contrast, if it is greater, the message 000 will then be transmitted over the line I/O and the data carrier will be invalidated.

By the process of reading the data carrier which has just been described, it can be seen that the user always perceives a constant functioning of the data carrier, regardless of whether use of the access key is proper or improper. Furthermore, the writing of an access bit or an error bit in the memory in each of the possibilities— right key or wrong key—always results in the same consumption of electrical current by the data carrier. In this way a swindler checking the card's current intensity will always see constant consumption, whether the key used is right or wrong.

Figure 17:
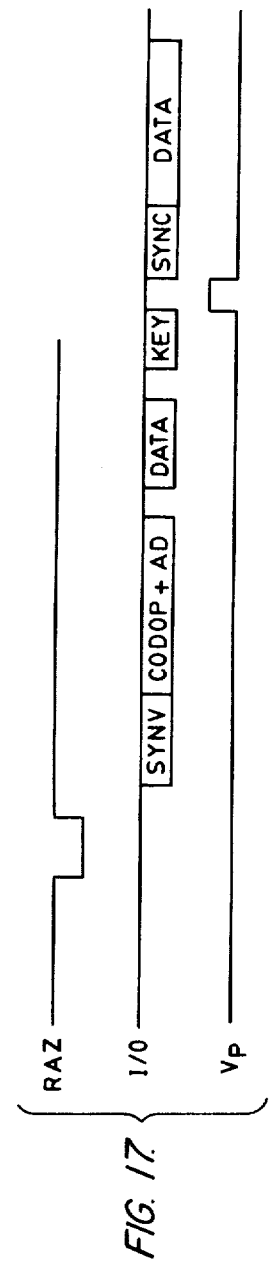
FIGS. 17 and 18 illustrate the functioning of a detachable medium in its memory writing mode.
Figure 18:
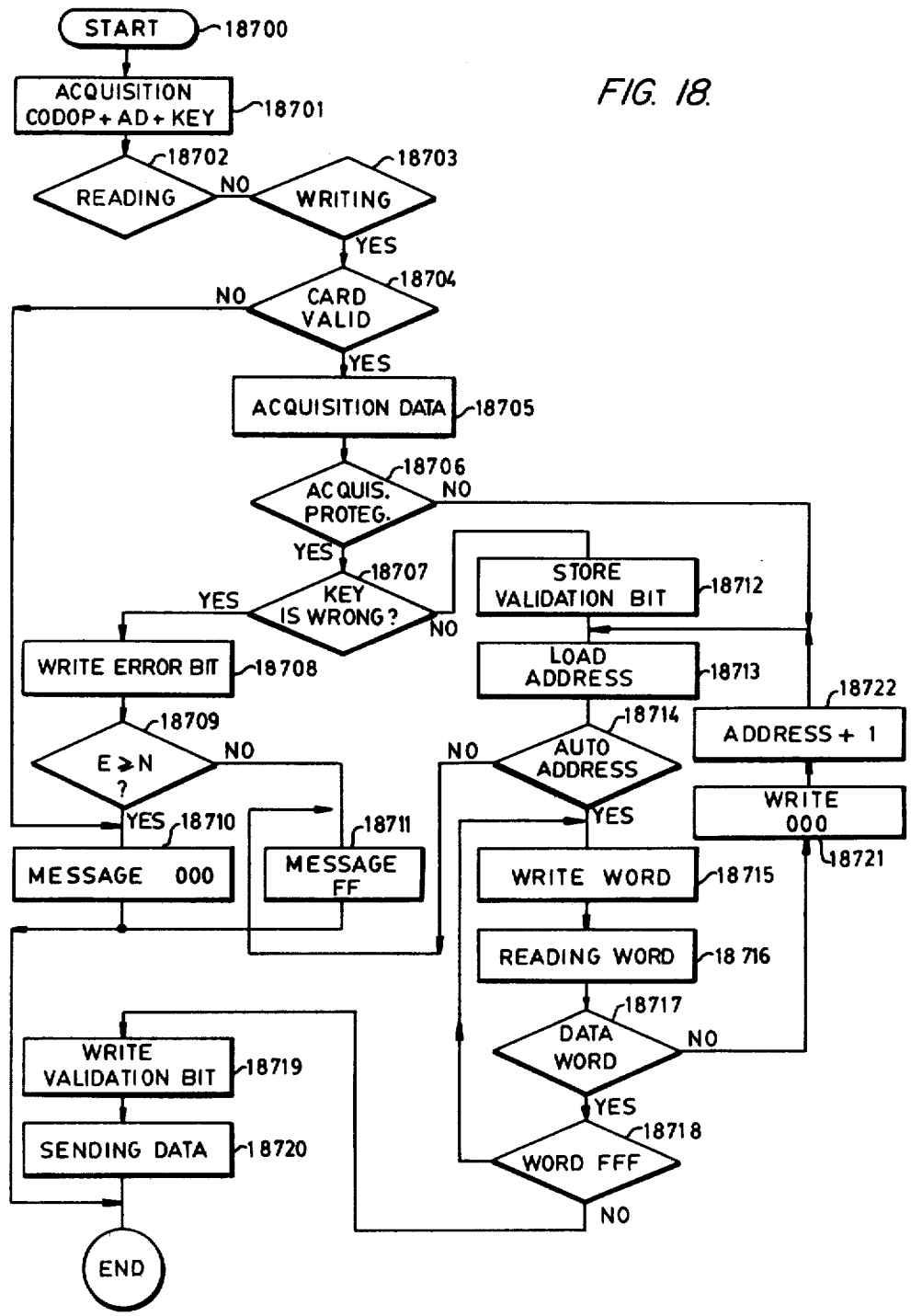

FIGS. 17 and 18 illustrate the functioning of a data carrier in memory-writing mode. In the diagram in FIG. 17, the signal RAZ initializes the control logic 416 and transfer into the register 424 of the data present on the line I/O. The write order appears in the form of a signal SYNC preceding an operation code "CODOP" followed by data address bits AD and a key if the writing is protected. The signal VP is then transmitted to permit writing of the item in memory 421 of the data carrier. So that the user can be certain that the item transmitted over the line I/O has been posted in the data carrier, the item stored in memory is reread and retransmitted to the user over the line I/O. The code "CODOP" is naturally specific to each application. In the flowchart in FIG. 18, the CODOP order and the address AD, whether or not followed by a key, are recognized by the data carrier by a test which takes place at the stage 18702 and 18703. At the stage 18704 a validity test of the data carrier is performed on the areas DEBE, DEBAC and FULL. If the data carrier is recognized valid, acquisition of the data takes place at the stage 18705.

If this is a protected writing, use of a key is necessary and a test on the key is done at the stage 18707. If the key is wrong, an error bit is posted in the error memory (stage 18708), then a test is done at the stage 18709 to verify that there is no overflow from the error area. If there is overflow, the data carrier transmits over the line I/O the code 000 signalling that the data carrier card is invalid (stage 18710). If there is no overflow, the data system transmits the message FFF over the line I/O (stage 18711) signalling that the item has not been written.

If the key is correct, a validation bit is stored at the stage 18712 and the address received is loaded into the address register 411 at the stage 18713. A check takes place at the stage 18714 to verify that the address received is within the authorized limits of the physical memory, i.e., between the addresses ADL and ADT. If such is not the case, the code FFF is transmitted over the line I/O (stage 18711) signalling that the item has not been written in the memory. If the address is authorized for writing, the item received over the line I/O is transmitted into the register 412 to be written in the part 1 of the memory 421 (stage 18715). A check takes place at the stages 18716, 18717 and 18718 to verify that the item is written in the memory. A validation bit is posted in the memory once the item is written at the stage 18719, then the item written is retransmitted over the line I/O to the stage 18720.

When the detachable data carrier has recognized the validity of the key (key no. 2 of the client), it transmits to the processing unit 115 an identification code In (key no. 1 of the client) which is its own and which distinguishes it from the other detachable data carriers in service. This identification code In is placed on the line IO1, and its validity is verified by the processing means 115 by comparison of a list of authorized identification codes contained in the storage means 107 (the clients of several banks may have access to the machine). If the identification code is acceptable, the generator 310 transmits over the lines I/O1 and I/O2 a random code E to each of the detachable data carriers. The microprocessors of each of the detachable carriers 102 and 104 then calculate a number R which is a function of the secret code S (code val C2 of the banker) for the program P and the identification code In residing in each of the memories of the detachable carrier and the random number E received from the processing unit 115. The number R is transmitted over each of the links IO1 and IO2 to the comparator 309 which detects an equality between the numbers R received if the parameters (program P, secret number S and identification code In) are identical in both of the detachable carriers. The program P can be divided to perform the following operations:

A. Make a concatenation of the numbers E and In Result R1
B. Make an "Exclusive OR" between the numbers R and S Result S1
C. Find the product of the numbers S, S1 and R1 Result R

| | Instructions | Remarks |
|---|---|---|
| 1. | Load A In | Load the registers |
| 2. | Load B E | A, B, C with the parameters In, E and S |
| 3. | Load C S | |
| 4. | MOV A B | Concatenation of |
| 5. | MOV T, A | In and E → Result R1 in the register T |
| 6. | XCT | Make the "Exclusive OR" between the registers C and T → S1 = R + S |
| 7. | MUL (T,C) | Multiply S × S1 |
| 8. | MUL (T,A) | Multiply S × S1 × R1 → R |
| 9. | LOAD $2^{64} - 1$ D | Si R ≧ $2^{64} - 1$ |
| 10. | Comp (T,D) | return to 1 |
| 11. | IF (1) | |
| 12, | End | |

The instruction code used for construction of the program P corresponds to the code for the microprocessors 8080 or 8085 marketed by the INTEL company.

Use of the detachable data carriers 102 and 104 makes it possible to obtain a double security access against swindlers seeking access to the machine. The first detachable data carrier processes by its internal processing means (220) data coming from the outside, making a correlation between those introduced by the interface means (112), (111), (4) or (5) and those contained in its memory areas (224) and (225) and which have been unalterably stored (as in ROM) at the time of its construction and entry into service. The correlation is made as described above by means of an algorithm, set or not, or a generally set access key.

Possession of a detachable data carrier also assumes a knowledge of the information and data necessary to be supplied to the distribution system so that the correlation can be accomplished in the detachable data carrier. Only the legitimate bearer of the detachable data carrier knows this information and data (224) which he himself has introduced previously.

Added to this first identification security is a second security measure consisting of the use of the second detachable data carrier (104) connected to the system by the second connection means (105) able to communicate with the information processing means (115) and having characteristics similar but not identical to said first detachable data carrier (102). The presence of this second, enabling detachable data carrier is necessary for correct use of said first detachable data carrier (102). As described above, each detachable data carrier contains in its memory a secret code S, an identification code In, and a program P, and the processing means of each of the data carriers calculate the function R=p (S, E, In) where E is the random code transmitted by the generator 310. The comparator compares the function R delivered by each of the data carriers to authorize or refuse authorization by the requesting party to the machine. As an alternative embodiment, the machine's processing means can be programmed for the generation of the random code E.

The storage means 107 and 109 and the printing means 113 and 114 as well as the links connected to the processing unit 115 do not need to be described in detail for the realization of the invention; they may consist of any type of peripheral data unit used in information processing systems. For example, they may consist of memory disk units or magnetic band units, or printers. Details on the constitution of these units are described in the book entitled "Peripheral Devices" by Ivan Flores and published by Practice Hall Inc., Englewood Cliffs, N.J., Copyright 1973. The display means are well known in the art, along with the data input means 12 which may be a simple keyboard. Similarly, means 116 for the distribution of articles or services may be of the type described in U.S. Pat. No. 4,166,945.

The programs 17 and 18 are stored in the memory ROM 31 of the information processing means 15.

The functioning of the machine which has just been described is as follows. The user holding a detachable data carrier (102) introduces the latter into the first connection means (101) reserved for this purpose. Following the instructions given through the display means (111), the user introduces into the system through the keyboard means 112 (or other input device) the data necessary for opening and pursuing the dialogue between his detachable data carrier (102) and the information processing means (115). At the start of the dialogue by way of lines 103 the information processing means (115) causes the data given by the user to pass from the components 111 and 112 into his detachable data carrier. The processing means of the detachable data carrier (102) establish whether there is a correlation between said data introduced and those proper to it (224) and which have been introduced in a previous phase. A prior consultation of the data stored in the security storage means (107) may take place to verify the rights of the detachable carrier's holder to utilize the machine's services, at the end of which the machine may reject the detachable carrier. Should the correlation made through the internal information processing means (220) be found correct, the detachable data carrier, through its decision-making means (222) returns a proper-correlation report to the information processing means (115) through the dialogue means 103, 119 and 221. The sequence may then continue.

The fifth means 114 for printing allows the user to receive specific information regarding the service requested, while the similar printing means (113) supplies the seller of the service or articles all the elements relating to the user and to the distribution made. As indicated above, the means 113 and 114 can be achieved by means of numerical or alphanumerical printers delivering a receipt or writing a ledger.

Through the dialogue or data exchange means consisting of the elements 103, 219 and 221, the information processing means (115) gives the detachable data carrier during communication all the elements and information necessary for its internal control and for filling its storage means (223). The information processing means is able to supply through the link 110 to the storage means (109) all the information necessary for handling the distribution by the seller of services, information proper to the user and to the detachable data carrier, and information proper to the distribution.

The result of the communication is distribution of the article or service through the distribution means (16), with the desired degree of security. These security elements can be classified into four levels:

A first level exists in the correlation between the information processed by the first detachable data carrier from the data introduced by the interface means 112, 111, 104 and 105 and those it contains in its storage areas (224) and (225) which have been unalterably stored (as in ROM).

A second level of security is contributed, as was previously seen, by the use of the second detachable data carrier to enable the first detachable data carrier to operate.

A third level of security is located in the data exchange on the link between the detachable data carrier (102) or (104) and the information processing means (115). This data exchange, previously described, may be carried by a single electrical line or a plurality of lines, which travel through the connection (101) or (105). This data exchange preferably is on a single line and uses only the variation of one and the same signal transmitted by the transmitter and detected by the receiver. This data exchange is bi-directional, the transmitter and receiver consisting respectively of the detachable data carrier 102 or 104 and the information processing means 115. This data exchange is logically designed so that each data word travelling through this single link is preceded by a predetermined, stable "ready to receive" state transmitted by the receiver and detected by the transmitter, and is followed by an end-of-message code combined with the relative parity on data train and possible an error-in-transmission message having a transitory stable state different from the permanent stable state ("ready to receive") detected by the transmitter and transmitted by the receiver.

The transmitter and the receiver can change roles on the same link. Therefore any third party listening to the signals on the link has no way to find the orders, data and information that can be ciphered and the reports that are continuously exchanged between the detachable data carrier (102) or (104) and the information processing means (115).

The fourth security level is located in the consultation of a storage means (107), internal to the system or not, detachable or not, which allows the information processing means (115) to decide whether the detachable data carrier present in the connection means 101 or 105 have been validated, and whether they have been subsequently invalidated to deny to the distribution system. This may be the case with a detachable data carrier stolen from the legitimate user with the data (224) permittng it to operate, and the disappearance of which has been notified to the seller of services. This can be done through the information 225 proper to the detachable data carrier or the information 224 proper to the user.

The distribution machine which has just been described can naturally distribute articles of all types, in particular coins or bank notes. It can also naturally supply a service, for example allowiing a door to open to give access to the area located behind the door.

A useful feature of the present invention is that a detachable data carrier can not communicate with other than the proper information processing means. These two elements, detachable carrier (102) and information processing means (115) are specific to one another because of the means (117) and (221), each specific to the system, the distribution of which it is attached. For example, if the portable data carrier (104) is adapted to the program means (118) is exchanged with a portable data carrier (102) adapted to the program means (117), distribution of the service requested will be prevented, since (104) can not communicate with the information processing means except through the means (118) and not through the means (117). The same detachable data carrier (102) can only communicate with the information processing means (115) through the means (117) and not through the means (118).

Another similar detachable data carrier valid for one type of distribution will be rejected by any similar distribution system but adapted to another type of distribution.

The example which has just been described of a preferred embodiment of the present invention is illustrative and in no way limiting. Numerous modifications and adaptations will be readily apparent to those of ordinary skill. Accordingly, the scope of the present invention should be determined by reference to the appended claims.

What is claimed is:

1. System for authorizing the distribution of articles or services comprising:
    first means for receiving first and second detachable data carriers, each data carrier having processing means, data storage means, decision-making means and interfacing circuits;
    second means for processing information from the first and second detachable data carriers;
    third means for providing bi-directional communication between the first and second detachable data carriers and said second means, the second detachable data carrier having means necessary for enabling said bi-directional communication between the first detachable data carrier and said second means; and
    fourth means responsive to said information processed by the second means for authorizing delivery of the articles or services.

2. System according to claim 1, wherein the third means exchanges data between each detachable data carrier and the second means by a single electrical line using the variations in one signal transferred between each detachable data carrier and the second means.

3. System according to claim 2, wherein the second means and each detachable data carrier may each act alternately as a receiver and as a transmitter of data.

4. System according to claim 3, wherein the receiver signals the transmitter it is in a "ready to receive" state by positioning said line at a voltage level detectable by the transmitter.

5. System according to claim 4, wherein the receiver signals the transmitter that it has found a transmission error by positioning said line in a temporary stable state detectable by the transmitter, the temporary stable state being different from the "ready to receive" state.

6. System according to claim 3, wherein the data exchanged between a detachable data carrier and said second means is coded data.

7. System according to claim 1, wherein the second means is responsive to the information processing means on the second data carrier and to the processing of information in a predetermined sequence of steps in the second data carrier for affording access of the first data carrier to the second means.

8. System according to claim 1 or 7 further including a local printing means for printing data for a holder of the first detachable data carrier and a remote printing means for printing said data at a remote location.

9. System according to claim 1 or 7 wherein the second means further includes storage means.

10. System according to claim 9, wherein the storage means includes a read-only memory.

11. System according to claim 7, wherein the system further includes means for establishing the identification of a user of a data carrier and for authorizing access to protected areas of the data storage means of a data carrier of the user whose identification has been established by the establishing means.

12. System according to claim 11, wherein the protected areas house an information processing means.

13. System according to claim 1 or 7, wherein the fourth means distributes money or bank notes.

14. System according to claim 1 or 7, wherein the system is a point-of-scale terminal.

15. System of claim 1, wherein the processing means of the first detachable data carries produces a first resultant $R_1 = P_1 (S, E, In)$ where $P_1$ is a first sequence of ordered steps performed on a random number E, a secret code S and an identification code In, $P_1$, S and In being stored in the data storage means of the first detachable data carrier, and the processing means of the second detachable data carrier produces a second resultant $R_2 = P_2 (S, E, In)$ where $P_2$ is a second sequence of ordered steps performed on the random number E, the secret code S and the identification code In, $P_2$, S and In being stored in the data storage means of the second detachable data carrier, the random number E being generated in the second means and the second means including means for comparing the first and second resultants and authorizing access if $R_1 = R_2$ and prohibiting access if $R_1 \neq R_2$.

16. A process for authorizing the distribution of articles or services at a data station the steps comprising:
   (a) inserting first and second detachable data carriers into the data station, each data carrier having a processor, a memory, and interfacing circuits;
   (b) generating a random number E and transferring the random number to each data carrier;
   (c) producing a resultant $R_1 = P_1 (S, E, In)$ in the processor of the first detachable data carrier where $P_1$ is a sequence of ordered steps performed on the random number E, a secret code S and an identification code In identifying the detachable data carrier or its holder, where $P_1$, S and In are stored in the first detachable data carrier;
   (d) producing a resultant $R_2 = P_2 (S, E, In)$ in the processor of the second detachable data carrier where $P_2$ is a sequence of ordered steps performed on said random number E, said secret code S and said identification code In;
   (e) testing to see if $R_1 = R_2$;
   (f) authorizing access to the data station if $R_1 = R_2$; and
   (g) refusing access to the data station if $R_1 \neq R_2$.

17. The process of claim 16 further comprising transferring the identification code In from the first detachable data carrier to the second detachable data carrier.

18. The process of claim 17, wherein the generating of the random number E occurs in the data station, the random number E then being fed into the processor of the first detachable data carrier and the processor of the second detachable data carrier.

19. The process of claim 16, wherein the testing to see if $R_1 = R_2$ is accomplished in the data station.

* * * * *

UNITED STATES PATENT AND TRADEMARK OFFICE
CERTIFICATE OF CORRECTION

PATENT NO. : 4,450,535
DATED : May 22, 1984
INVENTOR(S) : Bertrand de Pommery et al.

It is certified that error appears in the above-identified patent and that said Letters Patent is hereby corrected as shown below:

Column 20, line 53 (Claim 20, line 2), "scale" should read -- sale --.

Signed and Sealed this

Twelfth Day of March 1985

[SEAL]

Attest:

DONALD J. QUIGG

Attesting Officer    Acting Commissioner of Patents and Trademarks